(12) United States Patent
Dutton et al.

(10) Patent No.: US 7,953,723 B1
(45) Date of Patent: May 31, 2011

(54) FEDERATION FOR PARALLEL SEARCHING

(75) Inventors: Keith A. Dutton, Ojai, CA (US); Igor Roizen, Los Angeles, CA (US); Sanford J. Ganz, Studio City, CA (US)

(73) Assignee: Shopzilla, Inc., Los Angeles, CA (US)

( * ) Notice: Subject to any disclaimer, the term of this patent is extended or adjusted under 35 U.S.C. 154(b) by 536 days.

(21) Appl. No.: 11/245,600

(22) Filed: Oct. 6, 2005

Related U.S. Application Data

(60) Provisional application No. 60/616,743, filed on Oct. 6, 2004, provisional application No. 60/616,788, filed on Oct. 6, 2004, provisional application No. 60/616,744, filed on Oct. 6, 2004, provisional application No. 60/616,745, filed on Oct. 6, 2004.

(51) Int. Cl.
*G06F 7/00* (2006.01)
*G06F 17/00* (2006.01)

(52) U.S. Cl. .................... 707/707; 707/748; 707/971

(58) Field of Classification Search ....... 707/3, 999.003, 707/707, 748, 971
See application file for complete search history.

(56) References Cited

U.S. PATENT DOCUMENTS

| | | | |
|---|---|---|---|
| 5,875,446 A | 2/1999 | Brown et al. | |
| 6,101,491 A * | 8/2000 | Woods | 707/3 |
| 6,233,575 B1 | 5/2001 | Agrawal et al. | |
| 6,272,488 B1 * | 8/2001 | Chang et al. | 707/769 |
| 6,401,084 B1 | 6/2002 | Ortega et al. | |
| 6,463,433 B1 * | 10/2002 | Baclawski | 707/5 |
| 6,675,159 B1 | 1/2004 | Lin et al. | |
| 6,678,694 B1 | 1/2004 | Zimmermann et al. | |
| 6,728,704 B2 * | 4/2004 | Mao et al. | 707/3 |
| 6,772,170 B2 | 8/2004 | Pennock et al. | |
| 6,792,416 B2 * | 9/2004 | Soetarman et al. | 1/1 |
| 6,829,604 B1 * | 12/2004 | Tifft | 707/707 |
| 7,213,023 B2 | 5/2007 | Hadzikadic | |
| 7,359,898 B1 | 4/2008 | Acton et al. | |
| 7,424,469 B2 | 9/2008 | Ratnaparkhi | |
| 7,472,113 B1 * | 12/2008 | Watson et al. | 707/3 |
| 2003/0014405 A1 | 1/2003 | Shapiro et al. | |
| 2005/0149499 A1 | 7/2005 | Franz et al. | |
| 2005/0289168 A1 | 12/2005 | Green et al. | |
| 2006/0136405 A1 | 6/2006 | Ducatel et al. | |
| 2007/0016574 A1 * | 1/2007 | Carmel et al. | 707/5 |

OTHER PUBLICATIONS

Martin Theobald et al, "Top-k Query Evaluation with Probabilistic Guarantees", 2004, Proceedings of the 30$^{th}$ VLDB Conference, pp. 648-659.*

(Continued)

*Primary Examiner* — Mohammad Ali
*Assistant Examiner* — Brannon W Smith
(74) *Attorney, Agent, or Firm* — Kilpatrick Townsend & Stockton LLP

(57) ABSTRACT

A search engine can be configured to improve search times by implementing a parallel computing architecture. The index is split across a plurality of independent search nodes. A query is communicated to each of the parallel nodes and the query is searched in each independent node. The results from each node are routed to a federator that is configured to aggregate the results to a result set. The federator is configured to determine a subset of intermediate results to retrieve and aggregate from each of the independent nodes. The federator determines a number of results to retrieve from each of the nodes based at least in part on the number of nodes and the number of search results desired in the results set.

18 Claims, 9 Drawing Sheets

OTHER PUBLICATIONS

Tamar Sadeh, The Challenge of Metasearching, 2004, New Library World, vol. 105, pp. 104-112.*

Cynthia Dwork et al, Rank Aggregation Methods for the Web, 2001, ACM, pp. 613-622.*

Anagnostopoulos et al., "Sampling Search-Engine Results," *Proc. of the 14th Int. Conf. on the World Wide Web*, held May 10-14, 2005 in Chiba Japan, pp. 245-256, downloaded from http://doi.acm.org/10.1145/1060745.1060784 on Sep. 1, 2005.

Broder et al., "Efficient Query Evaluation using a Two-Level Retrieval Process," *Proc. of 12th Int. Conf. on Information and Knowledge Management*, held Nov. 3-8, 2003 in New Orleans, LA, pp. 426-434, downloaded from http://doi.acm.org/10.1145/956863.956944 on Sep. 1, 2005.

Cao et al., "Efficient Top-K Query Calculation in Distributed Networks," *Proc. of 23rd Annual Symp. on Principles of Distributed Computing*, held Jul. 25-28 in St. John's Newfoundland, Canada, pp. 206-215, downloaded from http://doi.acm.org/10.1145/1011767.1011798 on Sep. 1, 2005.

Chu et al., "Optimizing Data Aggregation for Cluster-based Internet Services," *Proc. of 9th ACM SIGPLAN Symp. on Principles and Practice of Parallel Programming*, held Jun. 11-13, 2003 in San Diego, CA, pp. 119-130, downloaded from http://doi.acm.org/10.1145/781498.781517 on Sep. 1, 2005.

Fagin et al., "Optimal Aggregation Algorithms for Middleware," *PODS '01*, held in Santa Barbara, CA (2001) available at http://citeseer.ist.psu.edu/fagin01optimal.html or http://www.wisdom.weizmann.ac.il/~Enaor/PAPERS/middle_agg.ps.

Ilyas et al., "Rrank-aware Query Optimization," *Proc. of 2004 ACM, SIGMOD Int. Conf. on Management of Data*, held Jun. 13-18, 2004 in Paris France, downloaded from http://doi.acm.org/10.1145/1007568.1007593 on Sep. 1, 2005.

Jones et al., "Query Word Deletion Prediction," *Proc. of 26th Annual Int. ACM SIGIR Conf. on REsearch and Development in Information Retrieval*, held Jul. 28, 2003 to Aug. 1, 2003 in Toronto, Canada, pp. 435-436, downloaded from http://doi.acm.org/10.1145/860435.860538 on Sep. 1, 2005.

Liu et al., "Personalized Web Search by Mapping User Queries to Categories," *Proc. of 11th Int. Conf. on Information and Knowledge Management*, held Nov. 4-9, 2002 in McLean, VA, pp. 558-565, downloaded from http://doi.acm.org/10.1145/584792.584884 on Sep. 1, 2005.

Theobald et al., "Efficient and Self-tuning Incremental Query Expansion for Top-k Query Processing," *Proc. of 28th Annual Int. ACM SIGIR Conf. on Research and Development in Information Retrieval*, held Aug. 15-19, 2005 in Salvador Brazil, pp. 242-249, downloaded from http://doi.acm.org/10.1145/1076034.1076077 on Sep. 1, 2005.

Kapetanios et al., "Query Construction through Meaningful Suggestions of Terms", LNAI 2522, pp. 226-239, 2002, © Springer-Verlag Berlin Heidelberg.

* cited by examiner

FEDERATION FOR PARALLEL SEARCHING

CROSS-REFERENCES TO RELATED APPLICATIONS

This application claims the benefit of U.S. Provisional Application No. 60/616,743 filed Oct. 6, 2004, titled "IMPROVED WORD DELETION FOR SEARCHES," U.S. Provisional Application No. 60/616,788 filed Oct. 6, 2004, titled "IMPROVED MEASURE OF PROBABLE RELEVANCE OF CATEGORY TO QUERIES FOR SEARCHES," U.S. Provisional Application No. 60/616,744 filed Oct. 6, 2004, titled "EFFICIENT FEDERATION FOR PARALLEL SEARCHING," U.S. Provisional Application No. 60/616,745 filed Oct. 6, 2004, titled "SEARCH INDEX KEY RANDOMIZATION," each of which is hereby incorporated herein by reference in its entirety.

BACKGROUND OF THE INVENTION

This disclosure relates to computer-aided searching, and in particular to networked systems that match queries to sets of documents and return a list of matching documents. It is particularly suited for Internet sites that match queries submitted from web browsers to product data stored on one or more servers. Accordingly, to illustrate the principles of the invention, it will be described in terms of an Internet-based shopping service. Those skilled in the art will appreciate that computer-aided searching has many applications and that improvements inspired by one application have broad utility in diverse applications that employ search technology.

Computers, networks, and the Internet have become a standard part of social and business infrastructure. Business now depends on the Internet just as it depends on telephone service. Many companies now sell goods and services online— sometimes from their own web sites; sometimes from intermediate sites similar to retail stores; and sometimes from high-level shopping sites that match shopper requests with product information. The use of computers allows an online shopping service to offer the buyer and the seller advantages that would be impossible for traditional retailers.

Many of these advantages derive from the combination of data storage technology and search engine technology. The shopping service or other service provider maintains a large library of information about products, services, and special offers. The shopping service also maintains a front-end web site so that shoppers can seek and see information from the underlying electronic library. The large volume of data almost obligates the use of a search engine to pinpoint relevant data. Typically, the web site provides a means for the shopper to indicate their area of interest, for example, by entering one or more keywords, attributes, or restrictions from a web page. The shopper's web browser sends the text or other data over the Internet or other network to the shopping service, where a search engine evaluates the request, compares it an index of documents to identify relevant items, and ranks the results by some measure of relevance. After formatting the results for display and adding text, pictures, scripts, and other data, the shopping service sends the results back over the network to the shopper's web browser. The shopping service can add value to the raw data, for example, by collecting data from many sellers and by supplying product evaluations, merchant evaluations, comparative pricing, and so on.

The practicality of these systems for shoppers, sellers, and the shopping service depends on, among other things, the speed of the system, the cost of the system, and the accuracy of the results. The popularity of the Internet as a meeting place for buyers and sellers means the databases of goods, services, and offers can become enormous—and so can the volume of requests, processing, and results. Unfortunately, each request is an unpredictable event, so the search engine must process incoming requests on the fly, in real time. And it must return results almost instantly, so that each shopper can interact with the site spontaneously. On top of that, it must return an accurate, appropriate reply to an imprecise, unstructured request.

Some search engines require the search originator to use an exact, technical syntax such as Boolean syntax to form each request. Such search engines allow a skilled searcher to formulate extremely specific requests and obtain extremely specific search results. Such search engines can be difficult for unskilled searchers to understand and operate, however—and even skilled searchers can fail to find salient results as a result of minor technical flaws in forming requests. Such search engines are relatively simple to implement because searcher assumes the burden of deducing and expressing the search logic, and because each request closely resembles the corresponding query executed within the search engine.

Other search engines permit natural-language or free-form requests. And such search engines often permit the use of short-cut indicators or prompts such as check boxes, drop-down lists, or other user-interface devices that indicate keywords, restrictions, or other attributes transmitted as elements of a search request. Such search engines are generally easier to use, especially for the unskilled searcher. Such search engines are generally more difficult to implement, however, because the search engine must perform sophisticated processing to derive logical queries from requests.

The ongoing expansion of online business creates an ongoing need to improve the systems that fulfill requests for information. Some advances reduce the response time of the data source, search engine, or both; for example, by reducing the computational cost of the components that evaluate and fulfill requests. Other advances increase the accuracy of the data returned, for example, by refining the methods used to select, rank, and format it. Gains in speed often enable gains in quality, since time saved in one functional area can be put to good use in another.

BRIEF SUMMARY OF THE INVENTION

A search engine can be configured to improve search times by implementing a parallel computing architecture. The index is split across a plurality of independent search nodes. A query is communicated to each of the parallel nodes and the query is searched in each independent node. The results from each node are routed to a federator that is configured to aggregate the results to a result set. The federator is configured to determine a subset of intermediate results to retrieve and aggregate from each of the independent nodes. The federator determines a number of results to retrieve from each of the nodes based at least in part on the number of nodes and the number of search results desired in the results set.

The disclosure includes a method of processing a user query. The method includes obtaining a query from a user, distributing the query to a plurality of independent nodes, each node configured to search a corresponding segment of an index of the corpus of documents, running the query in each of the nodes against the corresponding segment of the index of the corpus of documents to obtain from each of the nodes an intermediate results list of one or more documents in the document corpus deemed responsive to the query, determining a maximum number of results to retrieve from each of the intermediate results lists, and aggregating a number of results from each of the intermediate results lists into an output result list.

The disclosure also includes a method of processing a user query. The method includes obtaining a query from a user, distributing the query to a plurality of independent nodes, each node configured to search a corresponding segment of an index of the corpus of documents, running the query in each of the nodes against the corresponding segment of the index of the corpus of documents to obtain from each of the nodes an intermediate results list of one or more documents in the document corpus deemed responsive to the query, determining a maximum number of results to retrieve from each intermediate results list based on a total number of results desired, a number of independent nodes, and a predetermined confidence level, retrieving up to the maximum number of results from each of the intermediate results lists, and generating an aggregate output result list having no more than the total number of results desired.

The disclosure also includes an apparatus for processing a user query. The apparatus includes a plurality of computational nodes, each computational node configured to search a corresponding segment of an index of the corpus of documents to obtain from each of the computational nodes an intermediate results list of one or more documents in the document corpus deemed responsive to the query, and a federator configured to receive a query and communicate the query to each of the plurality of computational nodes and configured to aggregate a portion of at least one intermediate result list to generate an output result list.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Overview

Figure 1:
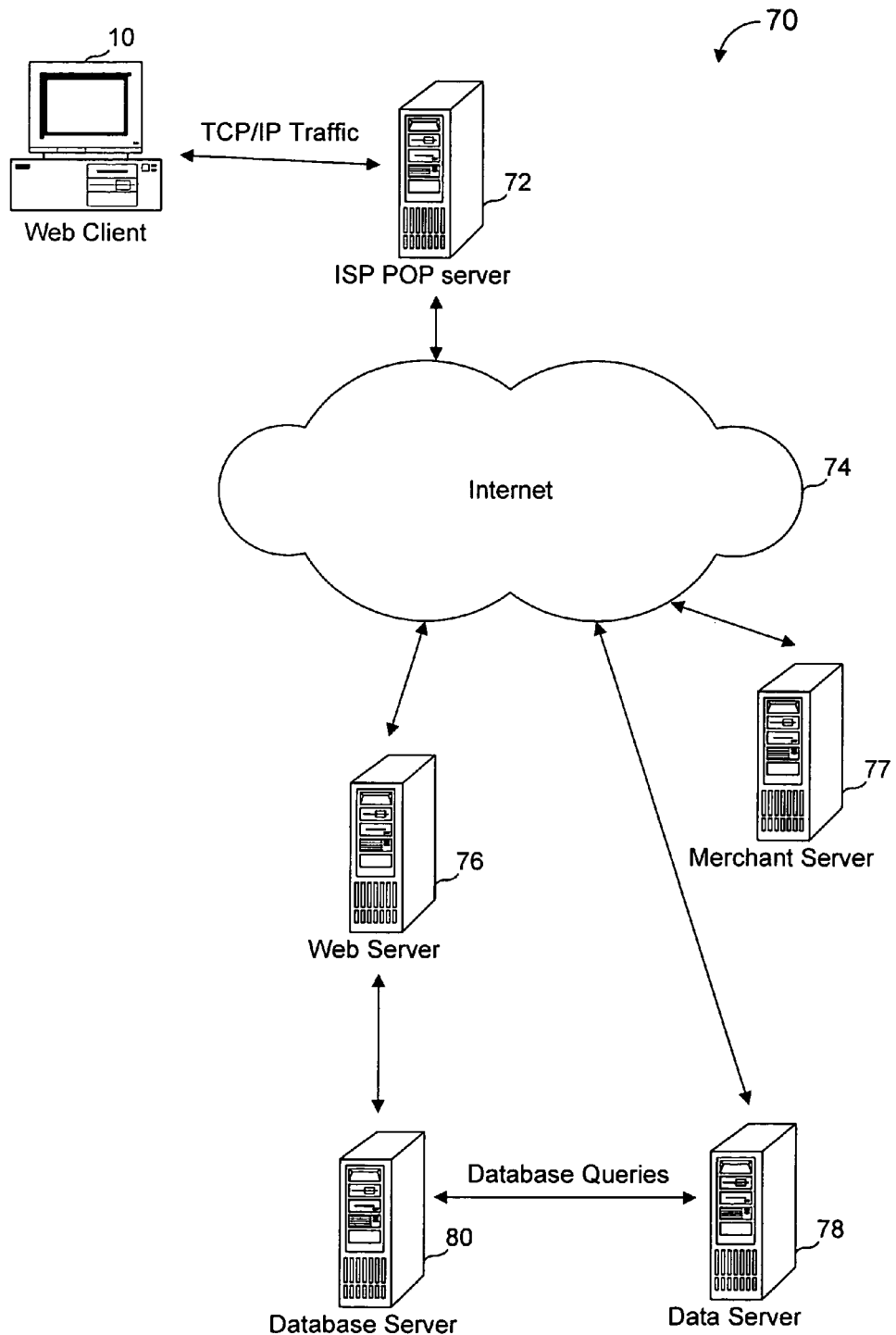
FIG. 1 is a simplified functional block diagram of an embodiment of a networked computer system.

FIG. 1 is a simplified functional block diagram of an embodiment of a networked computer system 70 in which embodiments of the search system described herein may be implemented. The networked computer system 70 is shown and described in the context of web-based applications configured on client and server apparatus coupled to a common Internet. However, the described system environment is used only as an example of one such system into which embodiments disclosed herein may be implemented. The various searchers and search system embodiments disclosed herein can also be implemented in other systems that do not require networked configurations.

The networked computer system 70 includes one or more clients 10 coupled to a network gateway. In one embodiment, the network gateway can be an Internet Service Provider (ISP) server 72 coupled to a network 74 such as the Internet. The client 10 can communicate with the ISP server 72 and destination devices coupled to the network 74 using one or more predetermined communication protocols. The communication protocol can be determined, for example, by an application running on the client 10. In one embodiment, the application can be a web browser and the communication protocol can be TCP/IP.

A web server 76 can be coupled to the network 74. The web server 76 can be configured to provide a network interface to information accessible via a database server 80. The web server 76 can be a host for a website or destination accessible via the network 76. The web server 76 can host, for example, a portal or website for a merchant. In another embodiment, the web server 76 can be configured to host a portal or website for an aggregator of data or information.

The web server 76 can be coupled to a database server 80 that can be configured to access data that is stored on a related data server 78. The database server 80 can be one or more servers or applications distinct from the web server 76 or at least partially common with the web server 76.

The database server 80 can be configured to facilitate the retrieval of data stored in the data server 78. For example, the database server 80 can organize and categorize the data in the data server 78 according to one or more predetermined taxonomies. The database server 80 can also be configured to include one or more searchers having one or more search engines configured to access the information stored on the data server 78.

The data server 78 can be configured as one or more servers or applications that are distinct or at least partially common with the database server 80. The data server 78 can include data or information that is retrieved via the database server 80. In another embodiment, the data server 78 can be configured to directly search, retrieve, and store data that is available, for example, from a source that is coupled to the network 74.

For example, the data server 78 can be configured to store data that is sourced from a merchant server 77 that is coupled to the network 74. The merchant server 77 can be configured, for example, as an electronic commerce site offering one or more goods or services. The data server 78 can be a data store for an aggregator that collects and provides information relating to the purchase of goods and services.

In one embodiment, the data server 78 or database server 80 can include a crawler, spider, robot, or similar application that is configured to discover and retrieve relevant data from sources coupled to the network 74. The robot can return the retrieved information to the data server 78. Additionally, or alternatively, the merchant server 77 can be configured to provide data to the database server 80 or the data server 78 for storage in the data server 78.

Other network sources can similarly provide information that can be stored in the data server 78. For example, a web client 10 user can submit a document, such as a product review, to a web server 76 of an aggregator site for storage on a date server 78.

The database server 80 can organize the data stored in the data server 78 according to one or more taxonomies. In any set of items, certain items may have relationships that suggest grouping them together into categories; and the resulting categories themselves may have relationships that suggest grouping them into higher-level categories; and so on. Sometimes categories appear to represent natural, real-world relationships; and sometimes they are simply conventional or convenient bins used to organize items. Categories can be the product of human insight, algorithmic analysis, or both working together.

A classification system based on categories is referred to as a "taxonomy." A common taxonomic structure is a tree-and-branch hierarchy, which proceeds by subdivision from the highest-level category (referred to as the "trunk"), to intermediate categories (referred to as "branches"), to terminal categories (referred to as "leaf," "leaf category," or "leaf node"), and ultimately to the underlying items (each referred to as a "document," "product," or "offer"). In general, any node or branch above a leaf node can be referred to as a higher node. Thus, every higher node is essentially a container of everything organized below it in the taxonomy. The leaf categories are the containers for the documents contained within them.

The underlying items within each leaf node can be referred to as "documents." Alternatively, the items within a leaf node may be referred to as a "product" or "offer." Each document can directly or indirectly include relevant information. For example, the document can be a file having information relevant to the corresponding leaf category. Alternatively, the document can be a pointer or address, such as a Uniform Resource Locator (URL) that identifies a site having relevant information.

Another general taxonomy structure is a directed arc structure, conceptually a graph consisting of taxonomic nodes and directed arcs that connect nodes. Each node represents a category, and each arc represents a parent-child relationship between categories, with the arc pointing from the parent category to the child category. Arcs do not necessarily follow the strict binary separation seen in many hierarchical tree-and-branch structures. Items may appear in more than one leaf category. Taxonomies differ in the rules for defining relationships between categories and items. The exact structural rules are nonessential. What is important is the general system where items fit into predetermined leaf-categories.

Documents stored in the data server 78 lend themselves to taxonomic arrangement. Each document can be an item, and an analysis of relationships among documents yields categories and leaf categories. For example, a service provider operating a portal website as a shopping service may create a taxonomy of consumer product categories and organize documents describing products, services, and offers by product category. For example, a parent category called "ELECTRONICS" might contain child categories called "DIGITAL CAMERAS," "TELEVISIONS," "DVD PLAYERS," and so on. If "DIGITAL CAMERAS" represents a leaf-category, then it contains zero or more indexed documents describing products, services, or offers involving particular cameras.

A user at a web client 10 can access the information stored in the data server 78 by accessing the web server 76. For example, a user at the web client 10 can access the information at the data server 78 using one or more applications running on the web client 10. The application can be, for example, a browser application.

The user can use the application running on the web client 10 to input a query to the web server 76. The web server 76 can relay the query to a searcher on the database server 80. The database server 80 can include a search engine that operates on the query to return a list of results that match the query.

"Search engine," as used herein, refers to a computer hardware and software system that, given a search request or query, matches the request to at least one index prepared from at least one data source, in order to identify terms in the index relevant to the request; and that if necessary performs logical operations on the request, the intermediate results, or both; and that returns a final list of relevant items, if any, to the search originator.

For example, the web client 10 can receive a query from a user and can submit the query to the web server 76. The web server 76 can present the query to a searcher or search engine in the database server 80. The database server 80 can respond to query by accessing the data server 78 and receiving a response (search results) indicating one or more "hits" found. A query can be in the form of search terms or key words, structured query statements (SQL, Boolean expressions, regular expressions, etc.), by selecting terms from choice lists, following links or a number of other methods currently in use or obvious to one of skill in the art upon review of current literature and/or the present disclosure.

When a query is received by a searcher, it processes the search and returns one or more "hits", where a "hit" is the atomic unit handled by the search system. The searcher can be configured to operate on a body or corpus of documents stored within the data server 78. For example, where the search system manages a structured database, the hits are records from the structured database. Where the search system manages documents, such as text documents, image and text documents, image documents, HTML documents, PDF documents, or the like, the atomic unit is the document. It should be understood that the present disclosure is not limited to any particular atomic unit. Furthermore, a structured database is not required.

For example, the web client 10 can include a desktop personal computer, workstation, laptop, personal digital assistant (PDA), cell phone, or any WAP-enabled device or any other computing device capable of interfacing directly or indirectly to the network 74. The web client 10 typically runs a network interface application, which can be, for example, a browsing program such as Microsoft's Internet Explorer™ browser, Netscape Navigator™ browser, Mozilla™ browser, Opera™ browser, Firefox™ browser, or a WAP-enabled browser in the case of a cell phone, PDA or other wireless device, or the like. The network interface application can allow a user of the web client 10 to access, process and view information and documents available to it from servers in the system.

The web client 10 also typically includes one or more user interface devices, such as a keyboard, a mouse, touch screen, pen or the like, for interacting with a graphical user interface (GUI) provided by the browser on a display (e.g., monitor screen, LCD display, etc.), in conjunction with pages, forms and other information provided by servers. Although the system is described in conjunction with the Internet, it should be understood that other networks can be used instead of or in addition to the Internet, such as an intranet, an extranet, a virtual private network (VPN), a non-TCP/IP based network, any LAN or WAN or the like.

According to one embodiment, the web client 10 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a processor readable storage medium, such as a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of the servers over the Internet, or transmitted over any other network connection (e.g., extranet, VPN, LAN, or other conventional networks) using any communication medium and protocols (e.g., TCP/IP, HTTP, HTTPS, FTP, Ethernet, or other media and protocols).

It should be appreciated that computer code for implementing aspects of the present disclosure can be C, C++, HTML, XML, Java, JavaScript, etc. code, or any other suitable scripting language (e.g., VBScript), or any other suitable programming language that can be executed on a client or server or compiled to execute on a client or server.

Figure 2:
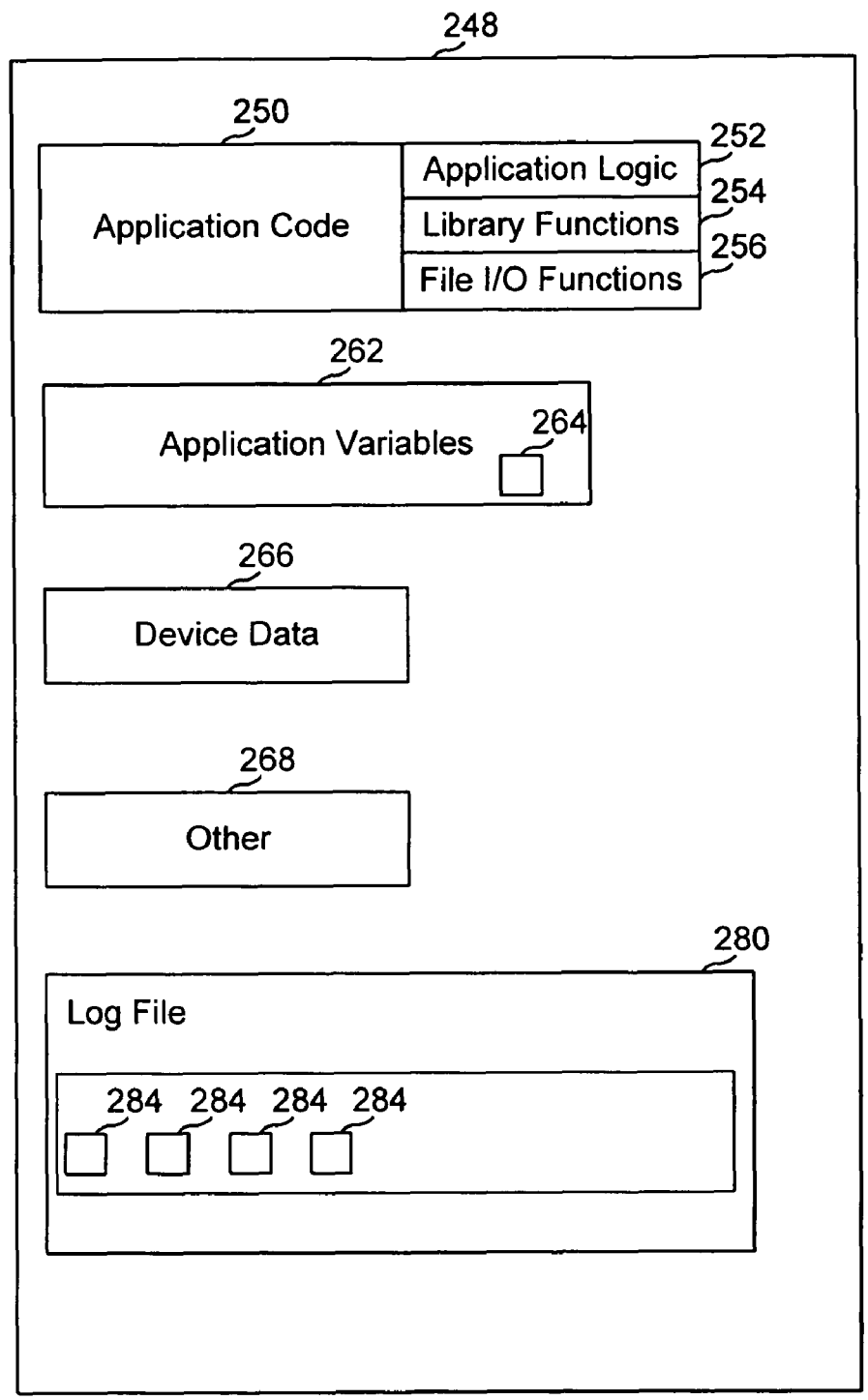
FIG. 2 is a simplified functional block diagram of an embodiment of a storage device having an application.

FIG. 2 is a simplified functional block diagram of a storage device 248 having an application that can be accessed and executed by a processor in a computer system. The application can be a client side application stored in the storage device 248 of a client and running on a client such as the web client 10. Alternatively, the application can be stored in the data storage of a server, and running on a server such as the database server 80.

The data store 248 can be one or more memory devices that can be accessed by a processor. the data store 248 can include application code 250 that can be configured to store one or more processor readable instructions. The application code 250 can include application logic 252, library functions 254, and file I/O functions 256 associated with the application.

The data store 248 can also include application variables 262 that can include one or more storage locations configured to receive input variables 64. The application variables 262 can include variables that are generated by the application or otherwise local to the application. The application variables 262 can be generated, for example, from data retrieved from an external source, such as a user or an external device or application. The processor can execute the application code 250 to generate the application variables 262 provided to the data store 248.

One or more memory locations can be configured to store device data 266. Device data 266 can include data that is sourced by an external source, such as a user or an external device. The device data 266 can include, for example, the search query input by a user or the corpus of data that is searched by a search application in response to a query.

The data store 248 can also include a log file 280 having one or more storage locations 284 configured to store results of the application or inputs provided to the application. For example, the log file 280 can be configured to store a history of queries or can be configured to store a history of query results.

Figure 3:
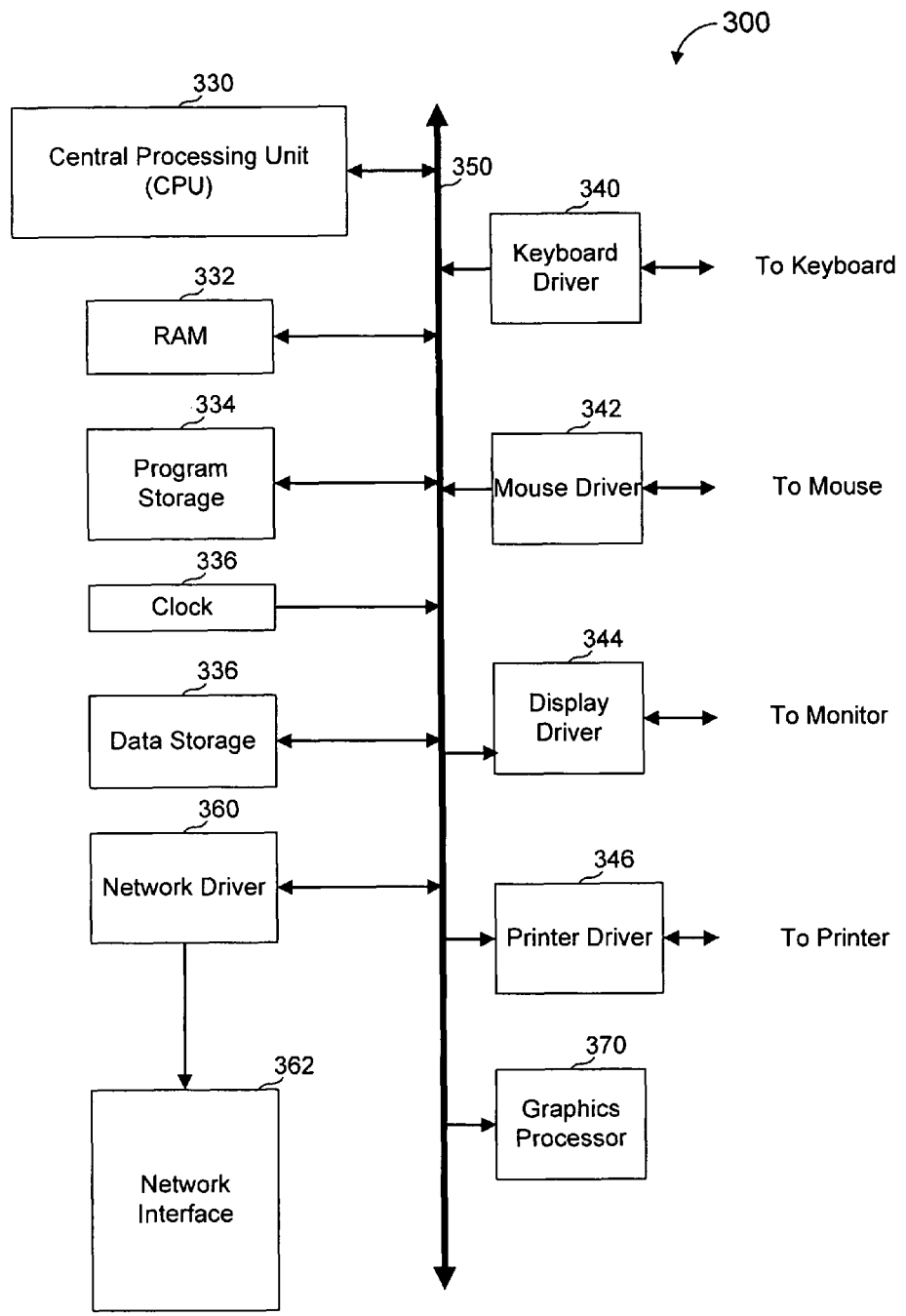
FIG. 3 is a simplified functional block diagram of an embodiment of a computer.

FIG. 3 is a simplified functional block diagram of an embodiment of a computer 300. The web client 10 and each of the servers shown in the system 70 of FIG. 1 can be implemented as a computer 300. The computer 300 can be configured to implement at least a portion of the data storage shown in FIG. 2, to support an application.

The computer 300 can include a Central Processing Unit (CPU) 330 coupled to one or more associated devices over a bus 350. The CPU 330 can be a general purpose processor a Reduced Instruction Set Computer (RISC) processor, or a combination of processors that can include, for example, a general purpose processor and a digital signal processor.

Although the bus 350 is shown as a single bus, the bus 350 can include multiple buses or communication links. For example, the computer 300 can implement a first bus that is configured to couple the CPU 330 to local memory, such as RAM 332. The computer 330 can also include one or more additional buses that are used to couple the CPU 330 to peripheral devices.

The CPU 330 can be configured to access program storage 334 to retrieve and execute an application stored therein. Program storage 334 can be any type of memory, and can be implemented as internal memory or removable memory. For example, program storage can include a hard disk, ROM, or some other type of memory.

The computer 300 can also include RAM 332 and data storage 336 typically used for temporary storage of data. The combination of RAM 332, program storage 334, and data storage 336 can be configured as the data store shown in FIG. 2. The computer 300 can include a clock 336 or time keeping device configured to track time for applications that are time or date related.

The computer 300 can also include one or more peripheral devices configured as input/output (I/O) devices or as devices supporting or otherwise related to I/O devices. The peripheral devices can include a network driver 360 coupled to the bus 350 and configured to communicate with a network interface device 362. The network interface device 362 can be configured to interface the computer 300 with a network, such as the network shown in the system of FIG. 1.

The peripheral devices can also include a keyboard driver 340 coupled to the bus 350 that is configured to interface a keyboard to the computer 300. Similarly, the computer 300 can include a mouse driver 342, display driver 344, and printer driver 346.

The computer 300 can also include a separate graphics processor 370 configured to operate with graphics intensive applications in order to reduce the processing load on the CPU 330. In some embodiments, the graphics processor 370 can be implemented with the display driver 344, for example, in a graphics card.

Figure 4:
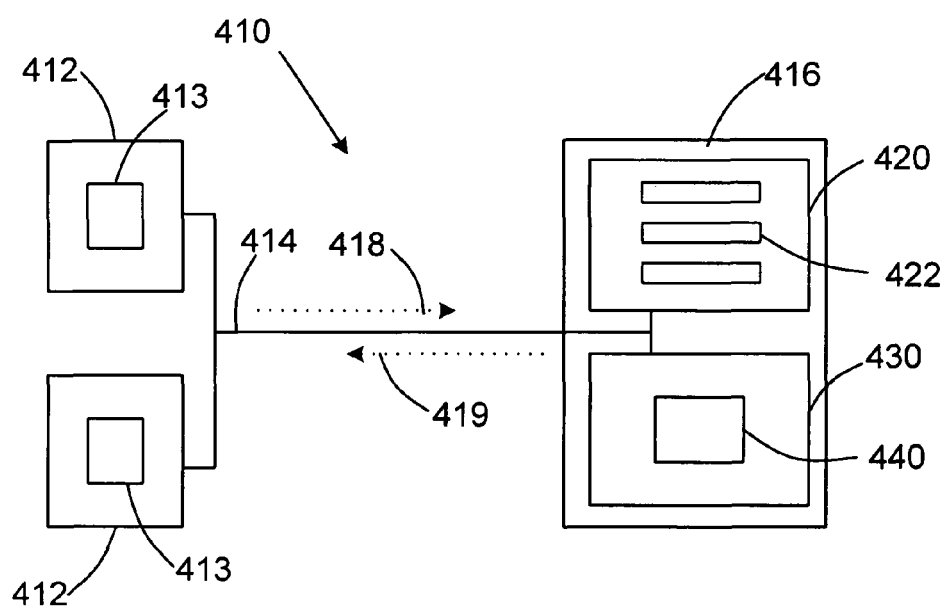
FIG. 4 is a simplified functional block diagram of an embodiment of a network based service provider.

FIG. 4 is another simplified functional block diagram of an embodiment of a networked computer system 410. The system 410 comprises at least one personal computer 412 (operated by a search originator, such as, a shopper, a robot "spider," or a partner site) connected to a network 414 such as the Internet. The personal computer 412 can be, for example, the computer 300 of FIG. 3.

Figure 8A:
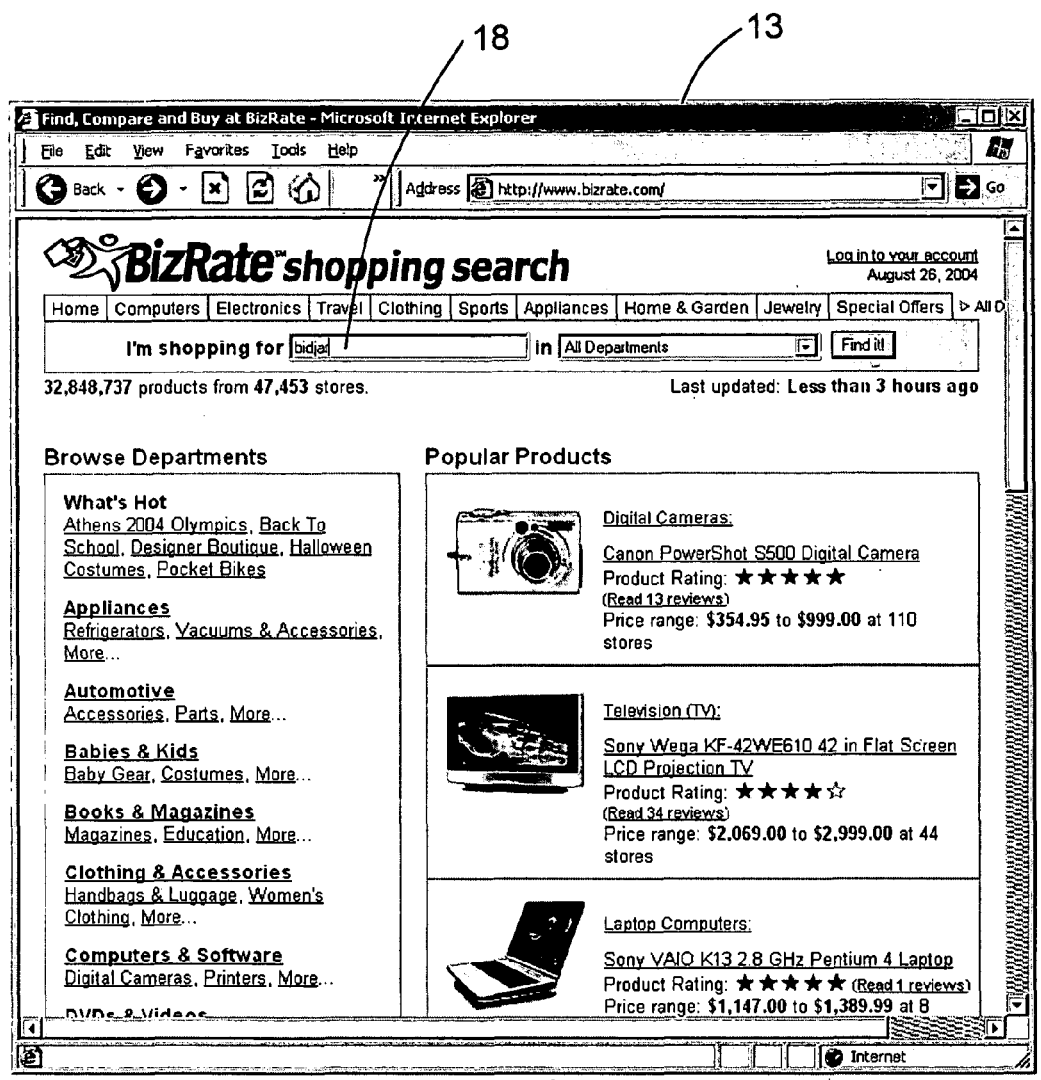
FIGS. 8A-8B are examples of screen images captured from an embodiment of a service provider.

Service provider 416, such as, but not limited to, a shopping service, maintains at least one data source 420 readable by a search engine 430 also connected (possibly indirectly) to network 414. In the embodiment of FIG. 1, the service provider 416 can include the web server 76 database server 80 and data server 78. Personal computer 412 runs application software 413 such as a web browser capable of sending a request 418 over network 414 to a designated network address such as that of service provider 416. FIG. 8A shows a "screen shot" of a representative web page including a text field for entering keywords as part of request 418.

Figure 8B:
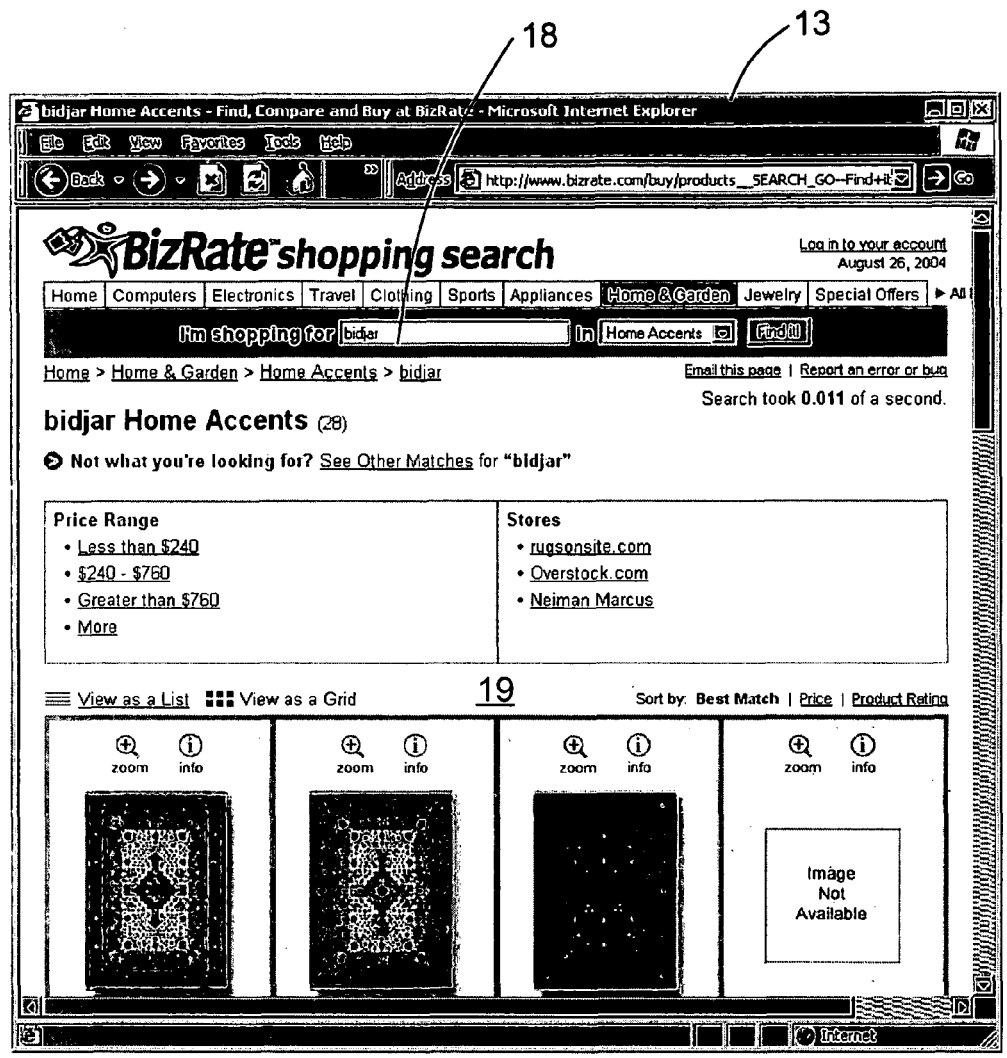

Service provider 416 routes incoming request 418 to search engine 430, which interprets request 418 and compares it, or derivatives of it, to an internal index 440 prepared from data source 420. Search engine 430 builds a list of matching documents 22 and can rank the match list in order by some measure of relevance. Search engine 430 may truncate the match list to some maximum length and may combine it with other data taken from data source 420 or other sources. Search engine 430 (perhaps indirectly by passing the match list to other components) then uses the match list to build a response 419, for example, by adding markup code in HTML, XML, or similar languages and by adding text, pictures, scripts, summary data, or other information taken from data source 420 or from other sources. Finally, service provider 416 sends response 419 over network 414 to personal computer 412 where application software 413 interprets response 419, for example by displaying a rendition of it to the shopper. FIG. 8B shows a "screen shot" of a web page displaying a representative response 419.

Figure 5:
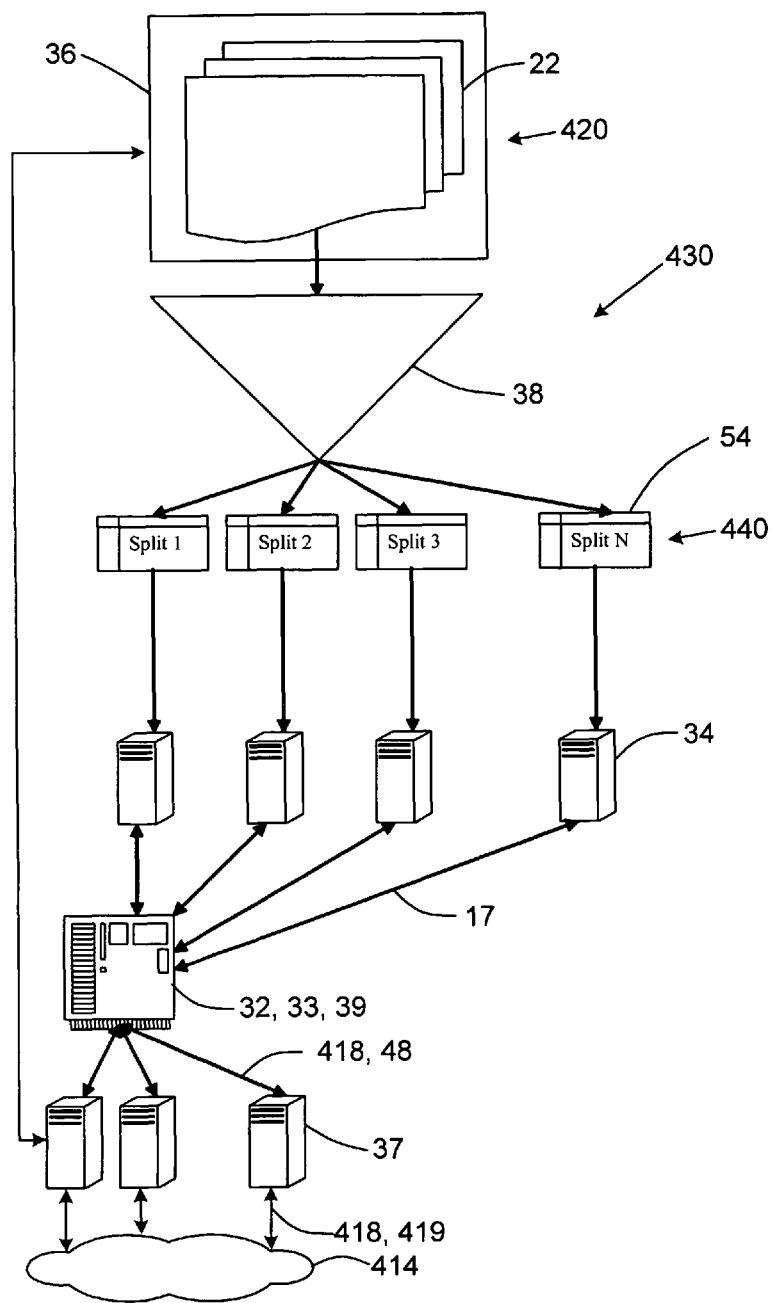
FIG. 5 is a simplified functional block diagram of an embodiment of a data source and search engine.

FIG. 5 is a simplified functional block diagram of an embodiment of a search engine 430 that can be a portion of a search system. The search engine 430 can include one or more search logic units (SLUs) 32, search auto categorizers (SACs) 39, federators 33, nodes 34, indexers 38, indexes 440, data or document servers 36, and formatters 37.

The SLU 32 is a component that receives requests or requests 418 from the front-end web site and interprets the requests or requests 418 by lexing, parsing, and other processing to generate processed queries 17. Federator 33 distributes queries 17 to one or more nodes 34, each of which is a component that can be configured to perform search-matching calculations on index 440 (which is, for embodiments with multiple nodes 34, split into multiple index segments 54). In another embodiment, the federator 33 can distribute the original request 418 to each of the nodes 34 for processing.

The indexer 38 is a component that compiles index 440 from data source 420 (and, for embodiments with multiple nodes 34, splits index 440 into segments 54). Document server 36 is a component that stores documents 22 and that, given a global key 24, returns the corresponding document 22. Indexer 38 and other system components can rely on document server 36 to obtain the content of documents 22.

Each node 34 returns its match list to federator 33, which (for embodiments with multiple nodes 34) builds a composite result 48 used to build response 419. If necessary, each node 34 or federator 33 uses a mapping table prepared along with index 440 to translate each random key 26 to the corresponding global key 24. Formatter 37 builds a formatted response 419 from a match list or composite result 48, for example, by combining it with text, pictures, scripts, and other data obtained from, for example, document server 36. Formatter 37 then sends response 419 to service provider's front-end web site, which passes response 419 to the requesting search originator via network 414.

Those skilled in the art will appreciate that all components of search engine 430 shown in FIG. 5 are high-level functional components comprising hardware and software; that search engine 430 may have more or fewer components; and that many variations are possible in the structure and arrangement of these components.

Data Source, Documents, Global Keys

Figure 6:
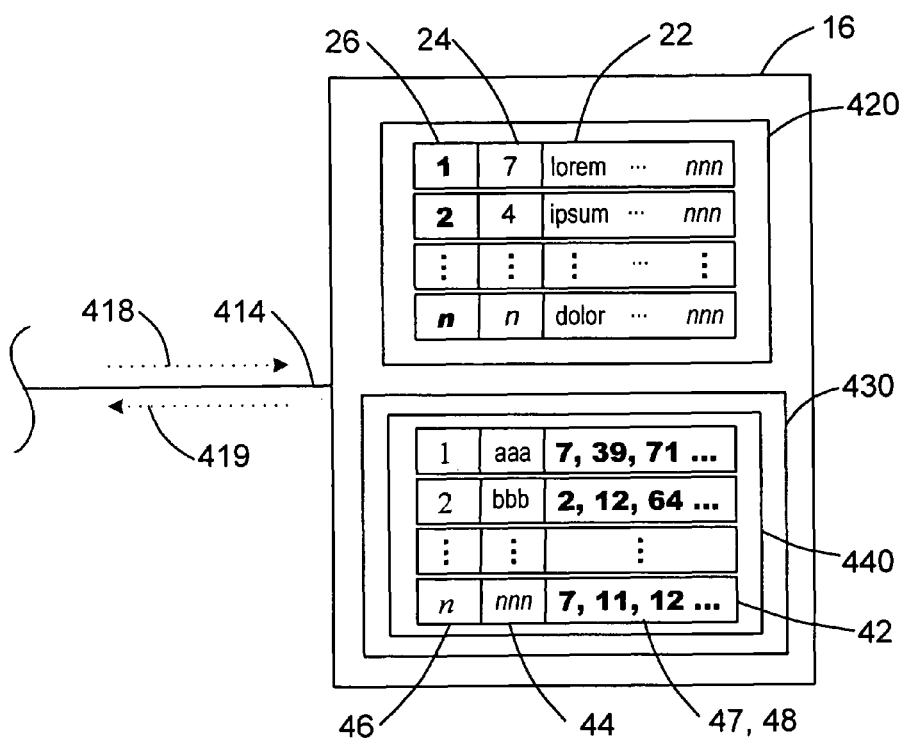
FIG. 6 is a simplified functional block diagram of an embodiment of a data source, search engine, and search index.

FIG. 6 is a functional block diagram of an embodiment of a data source 420, which can be implemented as hardware, software, or combination of hardware and software system adapted to store information for ready retrieval. For example, data source 420 can be implemented in the data server of the system of FIG. 1.

The data source 420 can include one or more documents 22. A document 22 is a means of storing static or dynamic data of any type, structure, or content, such as, but not limited to, text, pictures, scripts, computed values, and uniform resource locators (URLs). For example, a document 22 may be a structured or freeform text file containing lexical information, numerical information, or both; or a document 22 may be a local or remote web page accessed by manual or automatic methods; or a document 22 may be a record in a database comprising records comprising fields. For a shopping service, for example, a document 22 may be a text file that encodes information about products, services, or offers in a specified format and sequence. An "offer" in this context refers to a specific merchant offer, referring to a specific product and comprising, for example, price, availability, and other selected attributes. An offer may comprise multiple documents. However, the contents and format of the document 22 are not limited to any particular format or content and any particular content.

Each document 22 in data source 420 may have a unique identifier, referred to as a global key 24, that is typically assigned when document 22 is added to data source 420 and typically durable for the life of document 22. Global key 24 provides an efficient, unambiguous, stable "name" or "handle" for document 22 for use by system components that read, write, or otherwise reference document 22. The sequence of global keys 24 typically reflects the sequence of document addition, and the set of global keys 24 may become sparse after ongoing document deletion. To avoid undesirable properties associated with an index 440 that refers to documents 22 by means of non-random global keys 24, some embodiments of search engine 430 can create a second, randomized set of keys called random keys 26. Search engine 430 performs its internal computations on global keys 24 or random keys 26 and if necessary maps random keys 26 to global keys 24 for the benefit of components that operate on, or otherwise utilize, global keys 24.

Search Engine and Index

The search engine 430 can be a software and hardware system adapted to retrieve information from a data source 420. To use search engine 430, a search originator such as a shopper creates a request 418, for example, by entering one or more text keywords, attribute restrictions, or both on a web page. Search engine 430 may require a formal syntax such as Boolean syntax; or it may permit the use of natural language; and it may permit the use of short-cut indicators or prompts such as check boxes, drop-down lists, or other user-interface devices. After creating request 418, the search originator sends request 418 to search engine 430, for example, via network 414.

Search engine 430 via SLU 32 processes request 418 to extract significant search keywords, attributes, and restrictions and to build a query 17. Search engine 430 via federator 33 then sends query 17 to one or more nodes 34 that compare query 17 to one or more indexes 40 prepared from data source 420. For each term in index 440 that matches query 17, each node 34 returns a document list 48 comprising global keys 24 or random keys 26 for relevant documents 22. The matching method may consider complex queries 17 comprising multiple keywords, attributes, and restrictions, in any combination, so that a "final" document list 48 may represent the result of one or more logical or mathematical operations applied to one or more document lists 48. For embodiments with multiple nodes 34, federator 33 consolidates multiple document lists 48. After ranking the results by some measure of relevance, search engine 430"maps each random key 26 to the corresponding global key 24. Search engine 430 via formatter 37 calls document server 36 to get one or more documents 22 to obtain content for response 419. Either federator 33 or each node 34 maps each random key 26 to the corresponding global key 24 for the benefit of formatter 37. Formatter 37 then builds response 419 by adding markup code in HTML, XML, or similar languages and by adding text, pictures, scripts, summary data, or other information taken from data source 420 or from other sources.

Index 440 is a list of one or more index records 42, each comprising a term 44 relevant to data source 420, a unique index key 46, and data 47. The term "term" as used herein includes any item that is the potential subject of a search such as, but not limited to, single words, phrases, categories, products, services, and offers. "Term" also includes attributes and restrictions, where an "attribute" is any feature or combination of features representable by any sort of token, and a "restriction" is any word, phrase, category, attribute, or similar item to be excluded from searching or search results. For each term 44, data 47 typically comprises a document list 48 comprising set one or more random keys 26 selected to identify documents 22 relevant to term 44. Document list 48 is sorted in ascending or descending random-key order. Data 47 may include information other than mere random keys 26, such as, but not limited to, a count of the number of occurrences of term 44 in document 22. Each term 44 has a unique index key 46 that provides an efficient, unambiguous identifier for term 44 for use by search engine 430 or other system components that read, write, or otherwise reference a term 44 in index 440. Unique index keys 46 also permit splitting a document list 48 for a given term 44 among multiple nodes 34.

Figure 7:
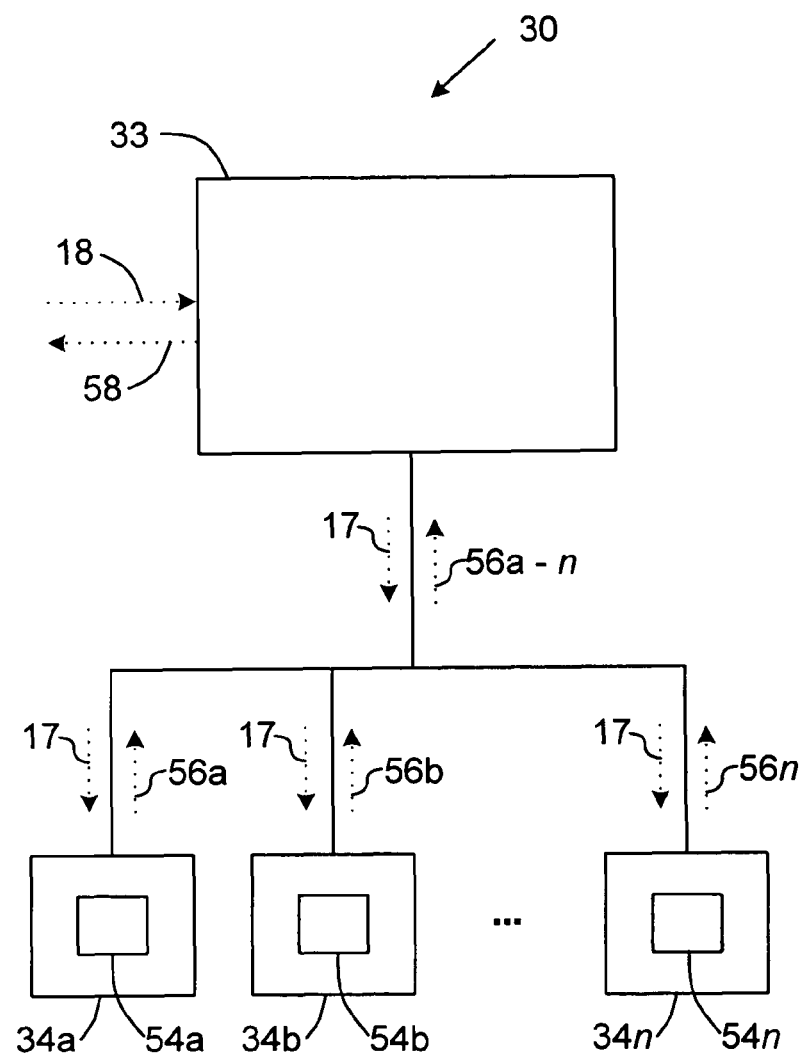
FIG. 7 is a simplified functional block diagram of a search engine.

Search engine 430 builds index 440 via indexer 38 by parsing at least one document 22 in data source 420 to extract terms 44 and a document list 48 for each term 44. Typically, indexer 38 starts with a first document 22, parses it, advances to a second document 22, parses it, and so on until indexer 38 has examined every document 22 in data source 420. The list of terms 44 may include predetermined or software-selected words, phrases, or other items, alone or in combination. For example, predetermined terms 44 might include product names known beforehand, and software-selected terms 44 might include all salient words that occur in data source 420. Index 440 therefore is a product of a software compilation run on data source 420, and index 440 must exist before search engine 430 can perform searches. Updating index 440 requires recompiling it. In some embodiments, index 440 may be split into multiple index segments 54, permitting a parallel execution of index-matching computations by multiple nodes 34a through 34n, as shown in FIG. 7.

Conceptually, index 440 for search engine 430 is similar to the familiar subject index common for published books. The list of terms 44 is like the alphabetical list of words in a subject index, and document list 48 is like the set of page number references for each word. The general operation is also similar. With a subject index, a reader searches the alphabetical list for a word, looks up its indexed page number, and then opens the book to that page. With a computerized index, search engine 430 searches the list of terms 44 for terms 44 that match a request 418. For each match, search engine 430 returns a document list 48 as a basis for building a response 419 ultimately sent to application software 413. Unlike a subject index, a computerized index can perform logical operations, mathematical operations, or both on request 418, terms 44, document lists 48, and other parts of the system. For example, if request 418 comprises two terms 44 and seeks documents 22 containing both terms 44, then search engine 430 can look up the document lists 48 for both terms and compare the two lists to find their logical intersection.

Word Deletion

Search engine 430 allows the search originator to submit freeform, natural-language search requests 18. As described above, SLU 32 processes "raw" incoming requests 18 to generate queries 17 sent to one or more nodes 34, and nodes 34 apply queries 17 to index 440 (or index segments 54) to perform low-level index-matching operations. The processing applied by SLU 32 to derive queries 17 comprises various lexical operations, such as, but not limited to: extracting the "stem" of a word to also search for its syntactical variations; checking spelling to correct human error; looking up a word in a thesaurus to also search for its synonyms; and eliminating common words ("stop words") to avoid excessive computation during searching. Typical English-language stop words include "a," "an," "the," and similar syntactic elements that occur so frequently in English that they are rarely salient terms searching; and other languages have equivalent stop words. Those skilled in the art often prepare lists of language-specific stop words and ignore stop words for most searches.

"Word deletion," as used herein, includes a lexical operation applied to requests 18 when generating queries 17. Search engine 430 can be configured to accept freeform, natural-language requests 18. Such requests 18 are often imprecise, verbose, or both. Many spontaneous requests 18 initially fail to return a result at all because index 440 does not, by strict logic, contain data that fulfills the request 418 or initial base queries 17 generated from it. In an example, the initial request 418 may be overdetermined or may include miss-associated components. An example of a miss-associated request includes a request for a particular manufacturer's product identified by another manufacturer's part number or trade name.

Returning a "nothing found" response 419 is likely to frustrate and mislead the search originator. Data source 420 often does contain documents 22 relevant to the search originator's intended field of search (as distinguished from their verbatim request). Word deletion is a method for building a new query 17b based on the original request 418. As input, word deletion accepts a request 418 as formulated by the search originator. As output, it returns a subset of the words in the original request 418. The SLU 32, via federator 33, can then submit the new query 17b to nodes 34 in an new attempt to obtain a relevant result.

Word deletion attempts to remove words from the original search-query, based on its context as computed by a Search Auto Categorizer (SAC) 39. The SAC 39 is a search-engine component that, given a request 418 (or a derived query), returns a list of zero or more relevant leaf categories, each with a probability value to measure the relevance of the category to the request. SAC 39 provides such context through the mechanism of the probabilistic distribution of the leaf-categories in which the documents 22 relevant to the original request 418 may reside. "Leaf-categories," as used herein, are the non-intersecting atomic categories in a taxonomy, for example, that of a portal website. The taxonomic structure may be a "tree and branch" hierarchy; or, more generally, it may be a graph consisting of taxonomic nodes and directed arcs that connect nodes.

Each leaf category is a "terminal" category in the taxonomy and contains zero or more documents from a data source. Leaf categories can be the only categories that contain documents, which do not appear in parent categories. As terminal categories, leaf categories do not contain underlying successor (or "child") categories. In a directed-arc taxonomy, for example, leaf categories are those without arcs pointing at deeper categories. For each request (that is, a query), SAC 39 computes probabilities only for leaf categories. Leaf categories represent pre-existing "bins."

For example, for a portal website operated by a shopping service, each leaf category contains zero or more documents describing products, services, or offers. For example, a "parent" category called "ELECTRONICS" is not a leaf category if it has subcategories, such as, "DIGITAL CAMERAS," "TELEVISIONS," "CLOTHING," and so on. "DIGITAL CAMERAS," in contrast, is a leaf-category if it contains zero or more indexed documents indicating offers for digital cameras and no subcategories. In this situation, the SAC, given a query for "Canon PowerShot" (a brand name of a digital camera), would return "DIGITAL CAMERAS" as the highest-probability leaf category. It might also return other leaf categories at lower probabilities. For example, a tee shirt with a Canon logo might trigger a lower-probability return for the leaf category "CLOTHING."

Thus, search engine 430 can receive a request for which no relevant results will be returned. In such a situation, the search engine 430 can perform word deletion on the query in order to generate a query for which relevant results will be returned. The search engine 430 can be configured to perform word deletion according to one or more word deletion algorithms. The word deletion algorithms can loosely be described as word-pair analysis, exhaustive deletion, and build-up deletion.

Word-Pair Analysis

The search engine 430 can be configured to perform word pair analysis on an original query that will return no results without word deletion. The search engine 430 inputs the original query to the SAC 39. The SAC 39 operates on the original query and returns a list of leaf categories and for each identified leaf category, the probability that the query results can be found in the leaf category.

The search engine 430 can then submit the original query to the SLU 32 where the SLU 32 generates a plurality of word-pairs from the original query. In one embodiment, the SLU 32 can be configured to generate every possible word pair combination from the original query. in another embodiment, the SLU 32 can be configured to generate a subset of all possible word pair combinations. In yet other embodiments, the SLU 32 can be configured to generate word pairs from the original query for further processing until a threshold number of word pairs have been analyzed, or until all possible word pairs have been analyzed.

The SLU 32 submits each word pair as a query. The search engine 430 can then generate a count of documents corresponding to a search of the word pair. The counts will correspond to each leaf category identified by the SAC 39 for the original query. The search engine 430 can compute the weighted average of the counts by weighting each of the counts by the probability that the original query results lie within that leaf category.

The SLU 32 can then select one of the word pairs from the list of analyzed word pairs. The SLU 32 can select the word pair based on the weighted averages. The SLU 32 can select the word pair based on predetermined criteria. For example, the SLU 32 can select the word pair corresponding to the lowest weighted average if a larger, more general, list of search results is desired. Alternatively, the SLU 32 can select the word pair corresponding to the highest weighted average if a smaller, more narrowly focused list of search results is desired.

The SLU 32 then generates two queries based on the original query and the selected word pair. The SLU 32 generates a first query by deleting from the original query, a first word from the selected word pair. The SLU 32 similarly generates the second query by deleting from the original query, a second word from the selected word pair.

The search engine 430 operates on each of the new queries and obtains for each of the two queries, a count of the documents in each of the leaf categories. For each of the queries, the search engine 430 computes a weighted average using the leaf category probabilities determined using the original query.

The SLU 32 can then select one of the two words in the selected word pair for deletion based on the results of the two weighted averages. The SLU 32 can delete the word corresponding to the highest weighted average if a larger, more general, search result is desired. Alternatively, the SLU 32 can delete the word corresponding to the lowest weighted average if a more focused, narrower, search result is desired.

The SLU 32 generates a truncated query by deleting the selected word from the original query. The search engine operates on the truncated query to return search results. The search engine 430 can determine the relevance of the search results using the leaf category probabilities determined from the original query or from a truncated query.

Therefore, the word-pair analysis algorithm can be summarized as follows:

1. Run SAC 39 on the original request, to obtain the distribution of probability among leaf-categories for the entire request.

2. For each word-pair in the original request, (a) run the word-pair through the search engine to obtain the counts of documents in every leaf category; (b) for each count of offers or documents, compute the weighted average of the above counts, using the leaf-category weights obtained in Step 1. "Word-pair" herein may refer to consecutive pairs or permuted pairs, and the construction of word-pairs may retain or delete stop words from the original query.

3. Choose the pair according to the two desired optimization options as follows: If a more generalistic larger set of final search results is desired, choose the pair with the lowest weighted-average. If it is desired to satisfy a user with a more specific and narrowly focused query, then choose the pair with the highest weighted-average.

4. For each single word from the word-pair chosen in Step 3, run the original query minus that word through the search engine, to obtain the counts of offers or documents in every leaf category, and compute the weighted average of the latter counts, using the leaf-category weights obtained in Step 1.

5. Delete from the original query the word in Step 4 which leads to the lowest or highest weighted average, in accordance with the two desired optimization options. If a more generalistic larger set of final search results is desired, delete the word leading to the highest weighted average. If it is desired to satisfy a user with a more specific and narrowly focused query, then delete the word leading to the lowest weighted average.

6. Rerun the search through the search engine and compute the final relevance using the distribution obtained in Step 1 and the truncated query obtained in Step 5.

Exhaustive Deletion

The search engine 430 can be configured to perform exhaustive deletion on an original query that will return no results without word deletion. Exhaustive deletion operates on the truncated queries rather than on word-pairs as in word pair analysis.

The SLU 32 generates a plurality of truncated queries based on the original query. To generate the truncated query, one word is deleted from the original query. Therefore, the number of truncated queries is based on the number of words in the original query. In another embodiment, one or more words can be deleted from the original query to create the truncated query. In such an embodiment, the number of possible truncated queries can be determined based on the number of words in the original query and the number of words that are deleted from the original query for each instance of the truncated query. Of course, the SLU 32 need not generate all possible truncated queries, but may generate a subset of all possible truncated queries based upon some predetermined criteria. In other embodiments, particularly in embodiments where the query is not completely preprocessed to include only word stems, the SLU 32 may generate a truncated query by deleting one or more words or one or more portions of words.

The search engine 430 operates on each of the truncated queries and returns a corresponding count of search results for each of the truncated queries. If all of the truncated queries return no search results, the word deletion analysis is complete and no search results are returned.

However, if any of the truncated queries generates non-zero search results, the SLU 32 can select a desired truncated query. Viewed from another frame of reference, the SLU 32 selects a word for deletion from the original query. The SLU 32 can identify the word for deletion, or otherwise select a desired truncated query based on predetermined crieteria.

In one embodiment, the SLU 32 can select the word for deletion or select the desired truncated query according to the count values. If a narrow, more focused, search result is desired, the SLU 32 can select the truncated query having the lowest non-zero count. Alternatively, if a larger, more general, search result is desired, the truncated query corresponding to the highest count can be selected.

The search engine 430 can then return the search results corresponding to the selected truncated query.

Therefore, the exhaustive deletion algorithm can be summarized as follows:

1. For each word w∈q, execute search_count(q−w). Here q represents the original query and w represents each word within the original query. If all counts are zero, return FAIL.

2. Operating only on the set of the words w which induced non-zero counts in 1), i.e., for which search_count(q−w)≠0, set $$q_{out} = q - \arg\min_{w \in q}(\text{search\_count}(q - w))$$

Here, the min can be replaced with max in accordance with the desired optimization policy as described above.

3. Return to the user results produced by search($q_{out}$).

Build-Up Deletion

The SLU 32 can perform build-up deletion by generating a truncated query based on the individual words of the original query. The SLU 32 begins with an empty or otherwise null truncated query and selects a word from the original query based on predetermined criteria.

In one embodiment, the SLU 32 can be configured to select a word from the original query for addition to the truncated query by selecting the word that results in the minimal search count when the word is added to the truncated query. The SLU 32 also does not attempt to select words that are already selected for the truncated query and does not select words that cause the truncated query to return no search results.

The SLU 32 continues to build the truncated query from the word in the original query until the remaining non-selected words in the original query would cause the search to fail if added to the truncated query. The truncated query is then determined to be the subset of words built up from the original query.

In another embodiment, the SLU 32 can be configured to select a word from the original query for addition to the truncated query by selecting the word that results in the maximum search count when the word is added to the truncated query. The SLU 32 continues to select words from the original query until the addition of another selected word causes the search of the truncated query to result in no results.

Therefore, the build-up deletion algorithm can be summarized as follows:

1. Start with the initially empty $q_{out}$, choosing, at every step for the inclusion into $q_{out}$, the word that minimizes search_count($q_{out} \cup w$).

2. Operating only on the set of the words w ∈ q which induce non-zero counts, i.e., for which search_count($q_{out} \cup w$)≠0, choose the w which minimizes search_count($q_{out} \cup w$), and add it to the $q_{out}$, i.e., $$q_{out} = q_{out} \cup \arg\min_{w \in q}(\text{search\_count}(q_{out} \cup w))$$

Here, the min can be replaced with max in accordance with the desired optimization policy as described above.

3. Set q=q−w, where w is the word obtained in 1), i.e., delete w from q.

4. Repeat steps 2 and 3 until q=∅.

5. Return to the user results produced by search($q_{out}$).

In practice, the search engine 430 can perform word deletion according to multiple deletion algorithms. The search engine 430 can, for example, run the exhaustive deletion and build-up deletion algorithms in tandem. The search engine 430 can initially run exhaustive deletion on the original query, and its result, if available, is returned to the user. If it returns FAIL, then the search engine 430 can perform build-up deletion on the same original query, and its result, if available, is returned to the user. The Exhaustive Deletion is tried first so as to impart a minimum alteration to the original query without invoking the Build-Up Deletion.

Notice that for brevity, the functions search(□) and search_count(□) are shown in the above algorithms with only one argument, namely, that of a query. In actual implementation, both functions can receive additional arguments restricting search and the deletion algorithms to operate only on a subset of attributes and atomic categories, when so desired by the user while navigating the site, or dictated by the business needs.

Imprecise Requests and Categories

Such requests 18 are often imprecise, verbose, or both. Many spontaneous requests 18 initially fail to return a result at all because index 440 does not, by strict logic, contain data that fulfills the request 418 or initial queries 17 generated from it. As noted earlier data source 420 often does contain documents 22 relevant to the search originator's intended field of search. Even if request 418 does yield one or more exact-match documents 22, it remains useful to identify contextually similar documents 22 based on request 418. The challenge is to accurately identify documents 22 significantly related to request 418, for example, to augment or redirect response 419 based on a context derived from request 418.

The taxonomy imposed on documents 22 groups together related documents 22. A request 418 that matches a particular document 22 inside a given category therefore probably has a strong relationship to all documents 22 in that category. For example, a request 418 that matches digital camera "A" probably has a strong affinity to digital cameras "B" and "C" even if "B" and "C" do not occur as direct search matches. And for a request 418 that do not return any direct matches at all, identifying categories with strong correlations to the request 418 creates a mechanism for constructing an appropriate response 419. The search engine 430 can be configured to measure the relevance of leaf categories to requests (that is, queries) for searches. The search engine 430 can identify leaf categories that have the best likelihood of fulfilling request 418. These leaf-categories may be a direct component of response 419 or may be subject of further processing.

Measure of Leaf-Category Probability for a Request

Search Engine 430 includes a Search Auto Categorizer (SAC) 39 and Search Logic Unit (SLU) 32. SAC 39 provides the SLU 32 with a query-context through the mechanism of the probabilistic distribution of the leaf-categories in which the products relevant to the search-query may reside. The relevance of any leaf-category to the entered query is defined as the probability of such leaf-category in the presence of the query.

The search engine 430 can compute relevance for each of the leaf-categories available on the website by obtaining an initial relevance-value estimate and then refining that estimate to convergence. The SAC 32 can generate an initial probability that the results lie within a particular leaf category. The SLU 39 can generate a relevance based on the probabilities generated by the SAC 32.

The probability values generated by the SAC 32 can be modified by operation of the SLU 39 to improve the relevance of the search results. The SLU 39 can weight the original probabilities determined by the SAC 32 to generate weighted probabilities. The SLU 39 can then operate on the weighted probabilities to generate a refined relevance. The SLU 39 can iteratively weight the probabilities and re-determine the relevance until the relevance converges to within a predetermined threshold.

The search engine 430 initially receives a request or query. The SAC 32 generates a list of leaf categories and the corresponding probabilities that the search results reside in the particular leaf categories. The SLU 39 uses the probabilities generated by the SAC 32 to determine a relevance of the search results. The SLU 39 can determine the relevance by initially determining the probability of a given product or document matching the query in a given leaf category.

In one embodiment, the SLU 39 can determine the probability of a document matching the query in a given leaf category by examining the extent to which the query matches the text or attributes of a document. For example, the SLU 39 can determine how many of the words in the query are in the actual document, and whether the words appear in the title, description, body, or some other portion of the document. The SLU 39 can take into account whether the matching query words appear in the same document field or if they are scattered across multiple fields. The SLU 39 can be configured to take into account other factors, such as in-stock availability, price, image availability, popularity based on prior user selections, merchant, and other factors. The SLU 39 can determine the probability of a document matching the query in a given leaf category based on a combination of all or a subset of these factors. For example, each of the factors may be associated with a probability or other metric and the SLU 39 can multiply together all of the relevant probabilities or metrics to arrive at the probability of a document matching the query in a given leaf category.

The SLU 39 then computes the relevance of the product to the original query. The SLU 39 can determine this relevance by weighting each of the earlier probabilities determined by the SLU 39 by the leaf category probabilities determined by the SAC 32, and summing over all leaf categories.

The SLU 39 can generate a revised probability that the search results reside in the particular leaf categories. That is, the SLU 39 can revise the probabilities initially determined by the SAC 32. For each leaf category, the SLU 39 can generate a revised probability that the product resides in that leaf category by weighting each relevance result from that leaf category previously determined by the SLU 39 by a predetermined weighting factor less than one. The revised leaf category probability is the sum of all weighted relevance probabilities within that leaf category.

The SLU 39 then determines an updated relevance based on the revised leaf category probabilities. The SLU 39 can continue to revise the leaf category probabilities based on the updated results and re-determine the updated relevance until the relevance values converge to within a predetermined threshold.

The relevance ranker can be summarized as follows:

1. In response to a search request, q, SAC computes an initial estimate of the probability $P(cid|q)$ that products (documents) relevant to that query reside in a given leaf-category, denoted cid.

2. SLU computes the probability, $P(pid|q, cid)$, representing the relevance of a product, denoted pid, found to match the query, q, in the category, cid.

3. The components computed in (1) and (2) are now combined to obtain the probability:

$$P(pid \mid q) = \sum_{cid} P(pid \mid q, cid) \cdot P(cid \mid q) \quad (1)$$

representing the relevance of the product, pid, to the query, q. Here, the summation extends over all of the categories, cid; where the product was found by the SLU to match the query, q.

4. SLU is now ready to improve the initial estimate obtained in (1) of the probability $P(cid|q)$ as follows: within each category, cid, where products were found to match the query, let $$P(cid \mid q) = \sum_{pid \in cid} w_{pid} \cdot P(pid \mid q) \quad (2)$$

where the weights $w_{pid}$ can be chosen according to business requirements modeled by a utility function combining the utility to the search-users as well as to the business entity providing the search, such that $$\sum_{pid \in cid} w_{pid} = 1.$$

For example, the weights can be chosen to decay monotonically with $P(pid|q)$ within each cid, so as to model user's decreasing with the number of products attention span and interest.

5. Steps 3 and 4 are now iterated until the probability $P(cid|q)$ converges to within prescribed tolerance between any two consecutive iterations.

6. The final probability of $P(cid|q)$ is returned.

Parallel Implementation

Referring also to FIG. 5 a search engine 430 can include one or more computational nodes 34a through 34n governed by a coordinating component called a federator 33. Federator 33 comprises computer hardware, software, and methods that manage and coordinate multiple nodes 34a through 34n. Federator 33 broadcasts each query 17 to a set of one or more nodes 34a-n, each comprising hardware and software components. Each node 34a-n stores a segment 54a-n of index 440, evaluates each query 17 using its index segment 54a-n, and returns its subset result to federator 33. Federator 33 aggregates subset results 56a-n from all nodes 34 to build a composite result 48. For embodiments that employ random keys 26, each node 34a-n translates each random key 26 in its subset result 56a-n to the corresponding global key 24 before passing its subset result 56a-n to federator 33. For other such embodiments, federator 33 maintains node-specific mapping tables, so that federator 33 can translate between key sets to build a composite result 48.

Index segments 54a-n are logically independent, so each node 34a-n can operate independently. Running the index-matching computations in parallel on multiple nodes 34a-n is faster than running the same computations in sequence on a single node or comparable computer. The speed improvement is approximately proportional to the number of nodes 34a-n. Therefore, search speed (also called "join time") can be approximately halved by doubling the number of nodes 34a-n. The total number of nodes 34a-n is variable and can be expanded almost without limit.

Splitting an Index into Multiple Segments

The process for preparing multiple index segments 54 from data source 420 for multiple nodes 34 is generally similar that for preparing a single index 440 except that, after preparing a list of terms 44 to be indexed and assigning an index key 46 to each term 44, data source 420 is apportioned into one or more data-source subsets 21 for separate indexing by indexer 38. Each subset 21 comprises one or more documents 22 selected without replacement from data source 420, effectively dividing data source 420 into approximately equal (or, in some embodiments, proportionately divided) portions, one portion per subset 21. For example, assume a data source 420 comprising five-hundred documents 22; and further assume a search engine 430 with ten nodes 34, and hence requiring ten index segments 54. Assuming nodes with approximately equal computational capacity, a general goal in this case is to divide data source 420 into ten subsets 21a-j, each comprising approximately fifty documents 22, with each document 22 sent to one and only one subset 21a-j. This process is generally similar to the familiar method for dealing cards from a deck to players in a rotating sequence, so that every player gets about the same number of cards, but dealing a card removes that card from the deck and assigns it to a particular player.

After thus partitioning data source 22, indexer 38 indexes a first subset 21a as previously described, then independently indexes a second subset 21b, and so on, until done. The result is a set of index segments 54a-n, typically one segment 54 per node 22. The set of index keys 46 is common to all subsets 21 and index segments 54, but each subset 21a-n has its own set of global keys 24 (or, in some embodiments, random keys 26). A particular key value on a first node 54a may indicate a different document than the same key value indicates on a second node 54b. In an embodiment, each node 34a-n maintains its own mapping table to translate its results (drawn from document lists 48 expressed in node-specific random keys 26) to global keys 24 (which are "recognized" by other components of search engine 430). In an alternative embodiment, federator 33 maintains a set of node-specific mapping tables to combine document lists 48 and other results from multiple nodes 34a-n without ambiguity.

When apportioning data source 420 into a given number of subsets 21a-n, it is desirable to randomly or pseudo-randomly assign each document 22 to a subset 21a-n. The preferred embodiment is to create a true-random apportionment, so that any document 22 is equally likely to be assigned to any subset. Many methods for randomly shuffling items into subsets are known to those skilled in the art and are suitable for this purpose. A general goal is to achieve a randomized, even distribution of data to nodes 22, so that each node 22 has an approximately proportional "slice" of data source 420. As mentioned elsewhere, a goal is to substantially balance the workload among nodes, which may differ in computational capacity. Some embodiments may intentionally allocate predetermined, differing proportions of data to different nodes, for example, to compensate for a faster node by giving it more data. "Even distribution" does not imply a requirement for exact mathematical equality or proportionality.

An alternative embodiment employs a pseudo-random apportionment of documents 22 into subsets 21a-n. For example, a representative method for pseudo-randomly dividing data source 420 into a given number of subsets 21a-n is to apply a modulus function to the unique global key 24 previously assigned to each document 22. Modulus is a relative of arithmetical division that, given a dividend and a divisor, yields the remainder but not the quotient. By using a given document's global-key value as a dividend and a desired number of index subsets 21 as a divisor, the result is an integer remainder that identifies an index subset 21 for that document 22. For example, assume a set of documents 22 with the global keys [11, 14, 19, 27, 32]. Further assume two nodes 34a,b, yielding a need to compile two index segments 54a,b from two index subsets 21a,b. Here, modulus with a divisor of "2" yields "0" for all even keys [14, 32] and yields "1" for all odd keys [11, 19, 27]. Here, modulus segregates "even" documents from "odd" documents, yielding two subsets 21a,b, with a first subset 21a comprising two documents [14, 32] and a second subset 21b comprising three documents [11, 19, 27].

A benefit to random or pseudo-random allocation is that it tends to distribute documents 22 with consecutive global keys 24 to different subsets 21a-n. Related documents 22 tend to enter data source 420 at about the same time, so that sequences of global keys 24 tend to reflect underlying relationships among documents 22. Randomly or pseudo-randomly assigning documents 22 to index subsets 21a-n disrupts this clustering because it sends documents 22 with adjacent global keys 24 to different subsets 21a-n and ultimately to different index segments 54a-n and nodes 34a-n. This disruption tends to spread related documents 22 among all nodes 34a-n and tends to minimize the risk that any one node 34 "has" a disproportionate share of documents 22 relevant to a given term 44. Document shuffling equitably distributes the computational workload among the available nodes 22. It also helps to assure that each node 22 returns a statistically representative sample of data drawn from data source 420.

For index segments 54 thus prepared, a given document 22n "contributes" to one and only one index segment 54n. All references to document 22n occur in index segment 54n as data in its document lists 48, and segments other than segment 54n do not contain data any data derived from document 22n.

Efficient Federation

Although a search-engine 30 according to the present invention offers almost unlimited scalability at the node level, federator 33 performs its processing in series, not in parallel. Its serial operation reflects the nature of its tasks. For example, the task of aggregating subset results 56a-n to build a composite result 58 does not lend itself to parallel execution because it is a "many to one" operation. The efficiency of federator 33 is a crucial aspect of the efficiency of search engine 430 taken as a whole.

For example, assume that index 440 doubles in size, for example, as a result of an increase in the number of documents 22 in data source 420. A search engine 430 according to present invention can keep the index-matching time (join time) approximately constant by doubling the number of nodes 34a-n in order to maintain an approximately constant size for each index segment 54. In this situation, federator 33 cannot avoid aggregating twice as many subset results, however, more than doubling the computational cost for building composite result 58 (because federator 33 needs to sort results, which is an nlogn operation).

A randomized or pseudo-randomized shuffling of documents allows specification of the probability of missing a document 22 from a result set. In particular, if the search engine is required to return the best s overall matches for a query against n nodes, assuming that the total product set is much greater than s, then if each node returns $n_1$ documents then the chance of aggregation of all the node result sets missing at least one of the required top s documents (due to it not being returned by a node) is $$\binom{s-1}{n_1} / n^{n_1}.$$

In other embodiments, the confidence level can be tabulated empirically through stochastic simulation, or by a recursive equation operating on the same or different variables. In an actual application, each computational node may return zero or more documents in its intermediate result set, and the number $n_1$ represents a maximum number of documents to retrieve from each intermediate result set.

Explicit tradeoffs between aggregation speed and probability of an incomplete result set readily follow. In some cases, for example, it may be worth returning only ten documents for each of twenty nodes to satisfy a query asking for the top fifty products. Knowing that such a shortcut gives a $$\binom{49}{10} / 20^{10},$$

or about 1/1000, chance of missing a top fifty product allows determination of whether this chance of missing the true result is worth the decreased federation time.

These surprising and beneficial results are easiest to understand by starting with a description of what would happen otherwise, without document shuffling.

To see what would happen without a shuffling of documents 22, consider index segments prepared by compiling a single, global index and then dividing it "vertically," for example, by ranges of index keys. Here, all of the entries for a given term 44 reside on a single node, yielding parallel index storage but not parallel search processing.

Alternatively, consider a multiple indexes prepared as described above but without document shuffling. This "horizontal" split yields index segments that list all of (or most of) the indexed terms, but the data in the document lists for each term derives from a set of associated or correlated documents. The goal of a typical search is to return a specified number of best-match entries from index 440. Without shuffling, any given node might happen to store all of, most of, or a disproportionate share of the best-match entries for a given search. Each node therefore must return a subset result at least as large as the specified best-match number. Otherwise, the search might easily fail to identify a significant number of salient documents. Multiple nodes therefore flood the federator with a large volume of results.

Document shuffling allows each node 34a-n to return fewer results to federator 33 than would be otherwise required, reducing the computational burden on federator 33. For example, suppose a request 418 requires a composite result 58 consisting of one-hundred matches. Without shuffling, the top one-hundred matches from any given node 34a-n might be the top one hundred matches. Every node 34a-n therefore must return one-hundred matches to federator 33, in order to be sure that composite result 58 contains the one-hundred best matches. With forty nodes, federator 33 must sort four-thousand items to build a composite result 58 that lists the top one-hundred matches. With shuffling, each node 34a-n can return fewer matches than the number required in composite result 58. The number of matches specified for each subset result 56a-n depends a desired level of statistical certainty, where in general increasing the size of each subset result 34a-n decreases the risk of missing salient matches. Attaining a given level of confidence might require each node to return only fifty matches, for example. With forty nodes, federator 33 now must sort only two-thousand items to build a composite result containing one-hundred matches.

Based on the assumption that documents are randomly distributed across nodes, the closed-form solution calculated the number of matches that each node must return to guarantee with an arbitrary-but-specified confidence level that the final aggregated result set has the top n products. The solution makes use of the fact that, given a random distribution of products across n nodes, the chance of the top two matches being on the same node is 1/n, and the chance of the top three matches being on the same node is 1/n^2. A specific innovation of the present invention is the statistical methodology to allow each node to return fewer than the top n items for a query asking for the top n.

Random Keys

As mentioned above, in an embodiment, each document 22 has a global key 24 to provide a durable identifier for each document 22. The sequence of global keys 24 contains embedded biases reflecting known and occult relationships among documents 22. For example, assume a data source 420 containing product data with global keys 24 assigned sequentially for each new document 22. Incoming batches of new documents 22 tend to be related to each other, so blocks of consecutive global keys 24 are more likely than average to reflect related information. For a shopping site, for example, a photographic supplier might send an email announcing several new cameras. This information would tend to enter the data source 420 as approximately consecutive documents 22 and generate approximately consecutive global keys 24. If index records 42 contain document lists 48 with an internal sequence governed by global keys 24, then operations performed on document lists 48 reflect the statistical biases or clusters embedded in the sequence of documents 22. An operation terminated before traversing the entire document list 48 therefore would not return a statistically representative sample of data source 420.

To avoid statistical biases in global keys 24, a search engine 430 according to the present invention creates a set of keys, called random keys 26, for internal use by federator 33, nodes 34, and other components of search engine 430. One method for randomizing random keys 26 is to start by counting the current number of documents 22. Given a known number of documents 22, indexer 38 can generate a same-sized pool of consecutive keys, select a first random key 26 randomly or pseudo-randomly from the pool, assign it to the first document 22, remove the used key 26 from the pool to assure uniqueness among keys, and continue in like manner to each succeeding document 22 until all documents 22 have a unique random key 26 selected at random from the pool. True-random selection is preferable, but in this context "random" includes pseudo-random selection.

That is, for a data source 420 on n documents 22, each with an arbitrary, unique global key 24, a random mapping to random keys 26 can be efficiently, but not uniquely, constructed by assigning to each global key 24 a number randomly selected, without replacement, from the integer interval [1,n]. Indexer 38 also constructs a mapping table to preserve the resulting tuples, each comprised of a global key 24, random key 26, and index key 46. In the case of a parallel division of index 440 across multiple nodes 34, the mapping is random on each individual index segment 54.

For example, in the case of a keyword index 440 for product documents 22, the term "camera" might occur in one-hundred thousand product documents 22. Document list 48 for "camera" therefore would comprise one-hundred thousand documents 22, with documents 22 occurring in random order with respect to the original data source, because the document list 48 for "camera" is sorted by random keys 26 and not by global keys 24.

This method for assigning random keys 26 yields a compact set of random keys 26, meaning that all consecutive values appear in the set of random keys 26, even though the sequence has been randomized. The term "compact" as used herein includes any uniform (equidistant) distribution of keys. Incremental adjacency, counting by ones, is a convenient compact distribution used as a representative example throughout. Global keys 24, in contrast, may reflect a discontinuous sequence, for example, as a result of ongoing deletion of documents 22 from data source 420. Random keys 26 assigned according of the present invention should be compact in this sense. For example, for an interpolation search with (say) ten documents with minimum random key 1 and maximum key 1,000, then it is known that on average each key takes up one-hundred units of space. If the keys were not compact, then perhaps two to nine-hundred would all be empty, in which case, the remaining nine keys would be distributed among only one-hundred numbers, leading to a very different required jump sequence for interpolation. Compactness facilitates the estimation of the density of the uniform distribution of random keys within a reverse index element. It would be possible to estimate the density of the uniform distribution if the distribution of the non-compactness was also known and global (for example, if every tenth number were skipped). This alternative embodiment introduces additional complexity than simply making the keys compact, and compactness has additional benefits such as faster execution.

When search engine 430 searches index 440, it looks up term 44 according to the value of its index key 46 to get a document list 48. Because the set of random keys 26 is randomized with respect to the set of global keys 24, the sequence of documents keys 26 within a document list 48 is random with respect to the underlying documents 22 in the data source 420. As a result, operations applied to one or more document lists 48 but terminated before traversing the entire document list 48 return statistically randomized random keys 26 indicating documents 22 that are a representative sample of data source 420.

Estimation Techniques

Searching in a sequence governed by sorted random keys 26 randomly mapped to global keys 24 means that any segment of the search sequence is a representative sample of data source 420. This represents is a simple and elegant solution provided by the present invention relative to the cumbersome approaches of the prior art. As a result of the present invention, search engine 430 can truncate certain searches and extrapolate from the subset results. For example, it is desirable to determine and report summary data such the total number of matches resulting from each search request 418. Since each request 418 is an unpredictable event, search engine 430 cannot pre-calculate summary data for every possible search. A randomized mapping of random keys to data-source keys eases the computational burden of preparing summary data because search engine 430 can estimate summary data without traversing the entire index. For example, a request 418 estimated to return one-million matches can be halted at one hundred-thousand matches, yielding a large sample but requiring about one-tenth the computation. Any desired summary data can be computed on this subset, and then a simple multiplication of summary counts by ten yields reliable estimates of the results that would have been obtained if the entire index had been queried.

The representative nature of the running results allows the search engine to dynamically determine when to perform such truncation by analyzing data from an ongoing search. For example, consider two different running outcomes when joining a one-million document term term1 to another one-million document term term2. Among the first sequential 1,000 documents in the document list for term1, (a) 1,000 matched documents are found in term2, versus (b) one matched document is found in term2. Using appropriate inferential statistics, the search engine calculates the expected number of documents returned to be much greater for (a) then (b), and so it may stop the search in case (a) much earlier.

Even if all the documents are returned from a search, so that the full join is performed, sampling made possible by random ids is a potential timesaver for operations that are performed on the result set after the join. For example, the search engine is commonly requested to provide summary counts of the attributes present in the final result set. Each document may be associated with a large number of attributes, so in the naïve case attribute summaries would require, for each document in the results, counting each attribute linked to the document. More efficient count estimates could be generated by randomly selecting documents whose attributes to count; however, such selection is itself a fairly expensive procedure. In contrast, the random ordering of documents in the result set, ensured by the reverse index's sorting by random id and the sequential nature of processing of documents within terms, allows the search engine to simply take the first n documents of the results as a random sample from which to generate attribute counts.

Interpolation Search

Another advantage to randomized keys is that search engine 430 can employ an interpolation-search technique (Knuth, Sorting and Searching, Second Edition (Reading, Mass.: Addison-Wesley, 1998) for finding matches, saving computation time in comparison to alternative techniques such as linear or binary searching. In a linear search, the search evaluates each entry in a list in sequence from the beginning. In a binary search, the starting point is the exact middle of the list, and each successive starting point divides the appropriate half of the remaining list exactly in half.

In an interpolation search, in contrast, a search starts by estimating the first position to check and continues by estimation until done. For a familiar analogy, consider the act of searching a printed phone book for the last name "Xavier." The letter "X" is known to be near the end of the alphabet. Given this knowledge, it is efficient to start the search near the end of the phone book. And if the first page tested contains names starting with "S," then it is efficient to try again near the end of the remaining pages ("S" through "Z"), since "X" is closer to "Z" than "X" is to "S."

The ability to use an interpolation search depends knowing how the items are distributed in a list, in order to rapidly make a good estimate of a target location. For example, if a list is known to be a list of integers 1 to n, and if the target is given as "t," then the estimated location would be index "t"—a match in one step as a result of the (perfectly) known distribution of the data.

Use of an interpolation-search technique allows search engine 430 to avoid performing a linear search (scanning the entire list) or binary search (successively dividing the remaining part of the list in half). For example, an interpolation search for a document whose random key is 100,000 within a reverse index with a maximum random key of 400,000, minimum of 1, and two-hundred thousand total documents, starts with an initial guess at quite efficient position of 50,000. It arrives at this estimate because there are two-hundred thousand documents spread uniformly in the range of 1 to 400,000, so that each document has an expected coverage of two; therefore, document key 100,000 is expected to be at 50,000. Then, depending on whether the initial position evaluates high or low, the search applies the same technique to the appropriate remaining interval of possibility.

Although extremely powerful, interpolation search is little used in practice because of the need to know the distribution of the underlying list. Randomization of random keys is a means of ensuring a known distribution—namely, an asymptotically uniform distribution.

Index 440 for any given term 44 contains a document list 48 of all the documents 22 that have that term 44. Document list 48 is ordered by random key 26 and hence has an expected uniform distance between elements. For example, if the term "the" has a document list 48 comprising one-million random keys 26 ranging from key 1 to 2,000,000, then on average each document accounts for a space of 2. That is, the document ids (random keys) of an index term that points to x documents identified by random keys out of a total set of n indexed documents are a random sample without replacement from [1,n], meaning that the document ids (random keys) are uniformly distributed on [1,n] with a density of x/n. Thus on average, each record takes up x/n of the total space of n (or, since the maximum record key n2 and minimum record key n1 are easily obtained for the index term, more precisely x/(n2−n1) of the actual space of the term: the documents are uniformly distributed on [n1,n2] with density x/(n2−n1)). Assuming reasonable-size index elements, so that boundary issues due to records near n2 and n1 may be neglected, each record then has on average x/(2n2−2n1) on each side of it, so the average distance between adjacent records is x/(n2−n1). Knowing this average distance, the search engine can at its discretion employ the highly efficient interpolation search algorithm.

Persons skilled in the art will recognize that many modifications and variations are possible in the details, materials, and arrangements of the parts and actions which have been described and illustrated in order to explain the nature of this invention and that such modifications and variations do not depart from the spirit and scope of the teachings and claims contained therein.

What is claimed is:

1. In a computerized search system in which queries are submitted by users who receive, in response, a list of documents selected from a corpus of documents wherein the list comprises documents deemed responsive to a user's query, a method of processing the query comprising:

obtaining the query from a user;

distributing the query to a plurality of independent computational nodes, each computational node configured to search a corresponding segment of an index of the corpus of documents;

running the query in each of the computational nodes against the corresponding segment of the index of the corpus of documents to obtain from each of the computational nodes an intermediate results list of zero or more documents in the document corpus deemed responsive to the query;

determining a number of results $n_1$ to retrieve from each of the intermediate results lists obtained by the computational nodes, the determined number of results $n_1$ providing a quantitative probability of not retrieving one most responsive result in an aggregated number of results, where the determined number of results is less than the aggregated number of results and the quantitative probability is given by a statistical formula:

$$\binom{s-1}{n_1} / n^{n_1},$$

wherein n is a number of independent computational nodes and s is the number of aggregated results; and aggregating the determined number of results from each of the intermediate results lists containing the determined number of results or more into an output result list, otherwise aggregating all results from each of the intermediate results lists containing fewer than the determined number of results into the output result list.

2. The method of claim 1, wherein the corpus of documents is evenly distributed among the independent computational nodes.

3. The method of claim 1, wherein each document within the corpus of documents is randomly assigned to one segment of the index.

4. The method of claim 1, wherein each document within the corpus of documents is pseudo-randomly assigned to one segment of the index.

5. The method of claim 1, wherein determining the number of results comprises determining the number of results based in part on a number of independent computational nodes.

6. The method of claim 5, wherein the determined number of results is further based on the aggregated number of results in the output result list.

7. The method of claim 1, wherein determining the number of results comprises determining the number of results independent of a number of results in each intermediate results lists.

8. The method of claim 1, wherein determining the number of results comprises determining a plurality of numbers of results with one of the plurality of numbers of results applicable to each of the intermediate results lists.

9. The method of claim 1, wherein the same determined number of results applies for all nodes.

10. The method of claim 1, wherein aggregating the number of results into the output result list comprises:

retrieving up to the determined number of results from each of the intermediate results lists to generate the output result list;

and ranking the documents in the output result list.

11. In a computerized search system in which queries are submitted by users who receive, in response, a list of documents selected from a corpus of documents wherein the list comprises documents deemed responsive to a user's query, a method of processing the query comprising:

obtaining the query from a user;

distributing the query to a plurality of independent computational nodes, each computational node configured to search a corresponding segment of an index of the corpus of documents;

running the query in each of the computational nodes against the corresponding segment of the index of the corpus of documents to obtain from each of the computational nodes an intermediate results list of zero or more documents in the document corpus deemed responsive to the query;

determining a number of results $n_1$ to retrieve from each intermediate results list based on a total number of results desired, a number of independent nodes, and a quantitative probability of not retrieving one most responsive result in the total number of results desired, where the determined number of results $n_1$ is less than the total number of results desired and the quantitative probability is given by a statistical formula:

$$\binom{s-1}{n_1}/n^{n_1},$$

wherein n is a number of independent computational nodes and s is the total number of results desired;

retrieving up to the determined number of results from each of the intermediate results lists; and generating an aggregate output result list having no more than the total number of results desired.

12. In a computerized search system in which queries are submitted by users who receive, in response, a list of documents selected from a corpus of documents wherein the list comprises documents deemed responsive to a user's query, an apparatus for processing the query comprising:

a plurality of computational nodes, each computational node configured to search a corresponding segment of an index of the corpus of documents to obtain an intermediate results list of zero or more documents in the document corpus deemed responsive to the query; and a federator configured to receive the query and communicate the query to each of the plurality of computational nodes and configured to aggregate a portion of at least one intermediate result list to generate an output result list, the output result list including an aggregated number of results, the federator selecting the portion of the at least one intermediate result list based in part on a quantitative probability of not retrieving one most responsive result in the aggregated number of results, wherein the federator is configured to determine a number of results $n_1$ to retrieve from each of the intermediate results lists based at least in part on a number of computational nodes n with the quantitative probability being given by a statistical formula:

$$\binom{s-1}{n_1}/n^{n_1},$$

wherein s is the number of aggregated results.

13. The apparatus of claim 12, wherein the corpus of documents is evenly distributed among the corresponding segments of the index.

14. The apparatus of claim 12, wherein each of the corresponding segments of the index of the corpus of documents references documents randomly allocated to the segment of the index.

15. The apparatus of claim 12, wherein each of the corresponding segments of the index of the corpus of documents references documents pseudo-randomly allocated to the segment of the index.

16. The apparatus of claim 12, wherein the federator is configured to determine the number of results to retrieve from each of the intermediate results lists based at least in part on the aggregated number of results in the output result list.

17. The apparatus of claim 12, further comprising a formatter coupled to the federator and configured to generate a response to the query based on the output result list.

18. The apparatus of claim 17, wherein the formatter is configured to retrieve at least a portion of documents identified in the output results list.

* * * * *